(12) United States Patent
Manger et al.

(10) Patent No.: US 9,823,119 B2
(45) Date of Patent: Nov. 21, 2017

(54) SYSTEM AND METHOD FOR ANALYZING A LIGHT BEAM GUIDED BY A BEAM GUIDING OPTICAL UNIT

(71) Applicant: Carl Zeiss SMT GmbH, Oberkochen (DE)

(72) Inventors: Matthias Manger, Aalen-Unterkochen (DE); Florian Baumer, Oberkochen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 15/347,348

(22) Filed: Nov. 9, 2016

(65) Prior Publication Data

US 2017/0122803 A1 May 4, 2017

Related U.S. Application Data

(63) Continuation of application No. PCT/EP2015/060145, filed on May 8, 2015.

(30) Foreign Application Priority Data

May 9, 2014 (DE) .................. 10 2014 208 792

(51) Int. Cl.
  *G01J 5/02* (2006.01)
  *G01J 1/42* (2006.01)
  (Continued)

(52) U.S. Cl.
  CPC .......... *G01J 1/4257* (2013.01); *G01J 1/0418* (2013.01); *G02B 5/205* (2013.01); *H05G 2/005* (2013.01); *H05G 2/008* (2013.01)

(58) Field of Classification Search
  CPC .................................................. G01J 1/4257
  See application file for complete search history.

(56) References Cited

U.S. PATENT DOCUMENTS

| 3,538,335 A | 11/1970 | Tartanian |
| 4,037,959 A | 7/1977 | Bumgardner |
| (Continued) |

FOREIGN PATENT DOCUMENTS

| DE | 19822924 A1 | 12/1999 |
| DE | 102012204674 A1 | 9/2013 |
| (Continued) |

OTHER PUBLICATIONS

International Preliminary Report on Patentability in counterpart International Application No. PCT/EP2015/060145, dated Nov. 24, 2016, 4 pages, along with English Translation.

(Continued)

*Primary Examiner* — Kiho Kim
(74) *Attorney, Agent, or Firm* — Edell, Shapiro & Finnan, LLC

(57) ABSTRACT

A system and a method for analyzing a light beam guided by a beam guiding optical unit. The system has a graduated neutral density filter arrangement (120, 520), which is arranged in a far field plane of the beam guiding optical unit and has at least one graduated neutral density filter (121, 521, 522, 523) having a spatially varying transmission, and a light intensity sensor arrangement having at least one light intensity sensor (140, 540), which is arranged in a near field plane of the beam guiding optical unit and is configured to measure (141, 541, 542, 543), for each graduated neutral density filter (121, 521, 522, 523) of the graduated neutral density filter arrangement (120, 520), a light intensity transmitted by each graduated neutral density filter.

17 Claims, 14 Drawing Sheets

(51) Int. Cl.
*G01J 1/04* (2006.01)
*G02B 5/20* (2006.01)
*H05G 2/00* (2006.01)

(56) References Cited

U.S. PATENT DOCUMENTS

| | | | |
|---|---|---|---|
| 4,378,490 A * | 3/1983 | d'Auria | G02F 1/0121 250/201.1 |
| 5,329,350 A | 7/1994 | Wright et al. | |
| 6,288,384 B1 | 9/2001 | Bahnmueller et al. | |
| 8,237,922 B2 | 8/2012 | Scaggs | |
| 2013/0248728 A1 | 9/2013 | Arnold et al. | |
| 2016/0341969 A1 | 11/2016 | Manger | |
| 2016/0350935 A1 | 12/2016 | Manger | |

FOREIGN PATENT DOCUMENTS

| | | | |
|---|---|---|---|
| DE | 102013224583 A1 | | 6/2015 |
| DE | 102014201779 A1 | | 8/2015 |
| GB | 1434304 A | * | 5/1976 |

OTHER PUBLICATIONS

International Search Report and Written Opinion in counterpart International Application No. PCT/EP2015/060145, dated Jul. 29, 2015, 19 pages.
Office Action in corresponding German Application 10 2014 208 792.9, dated Apr. 1, 2015, along with English Translation, 7 pages.

* cited by examiner

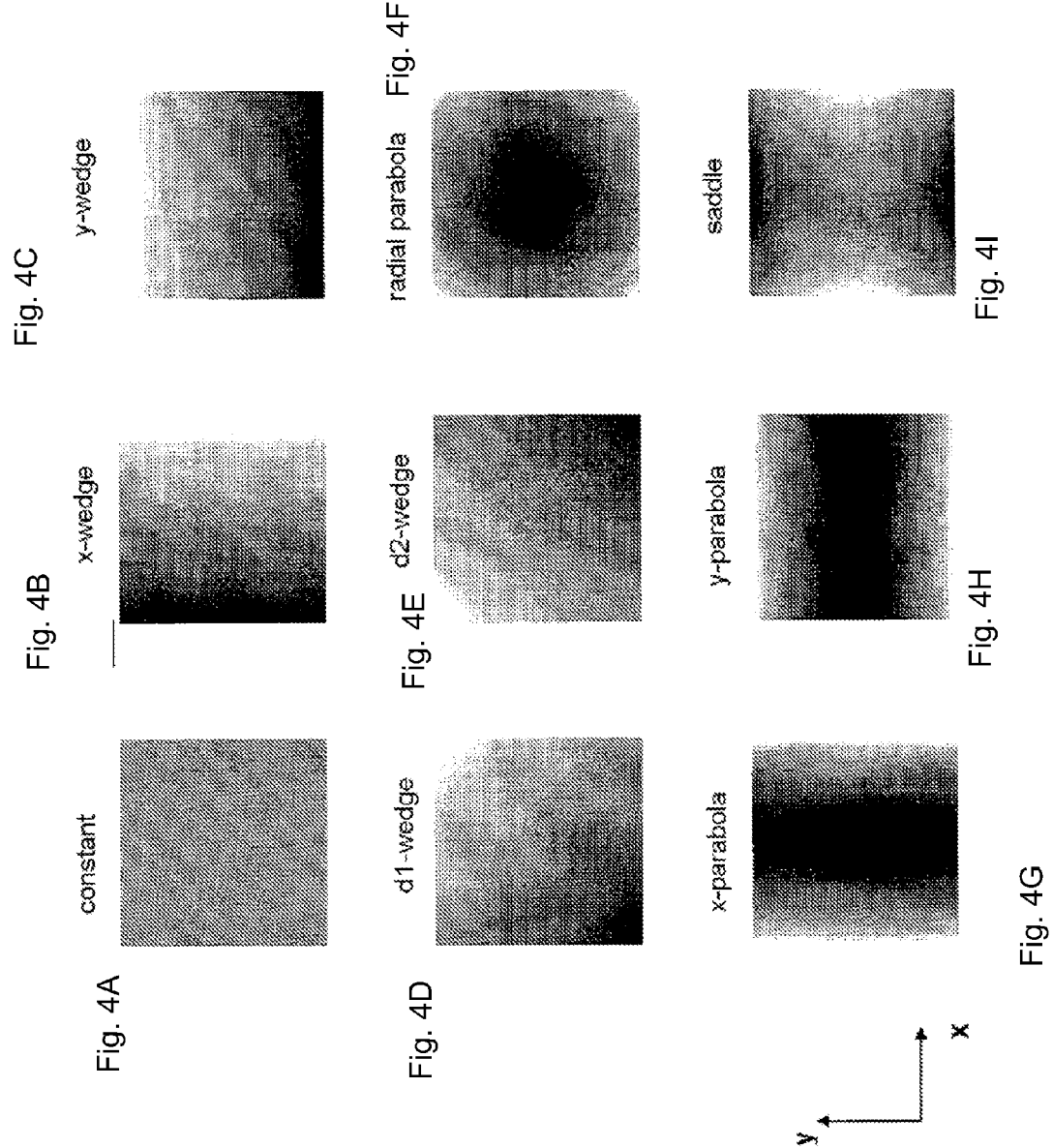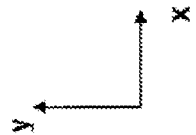

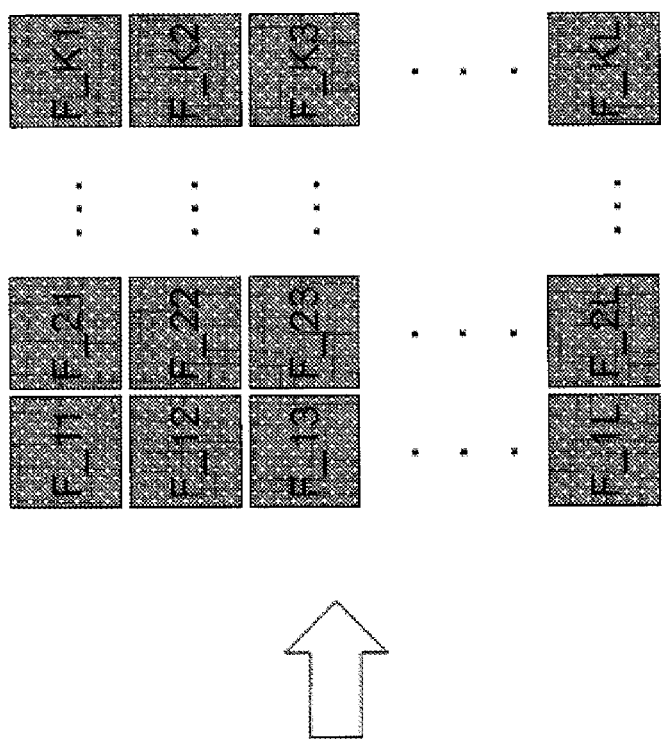
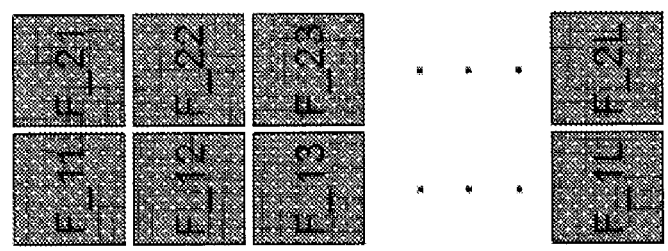
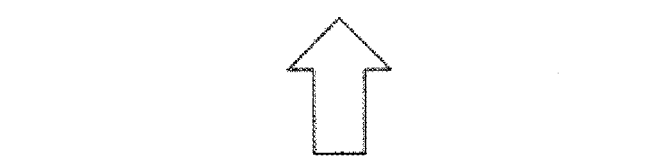
Fig. 7

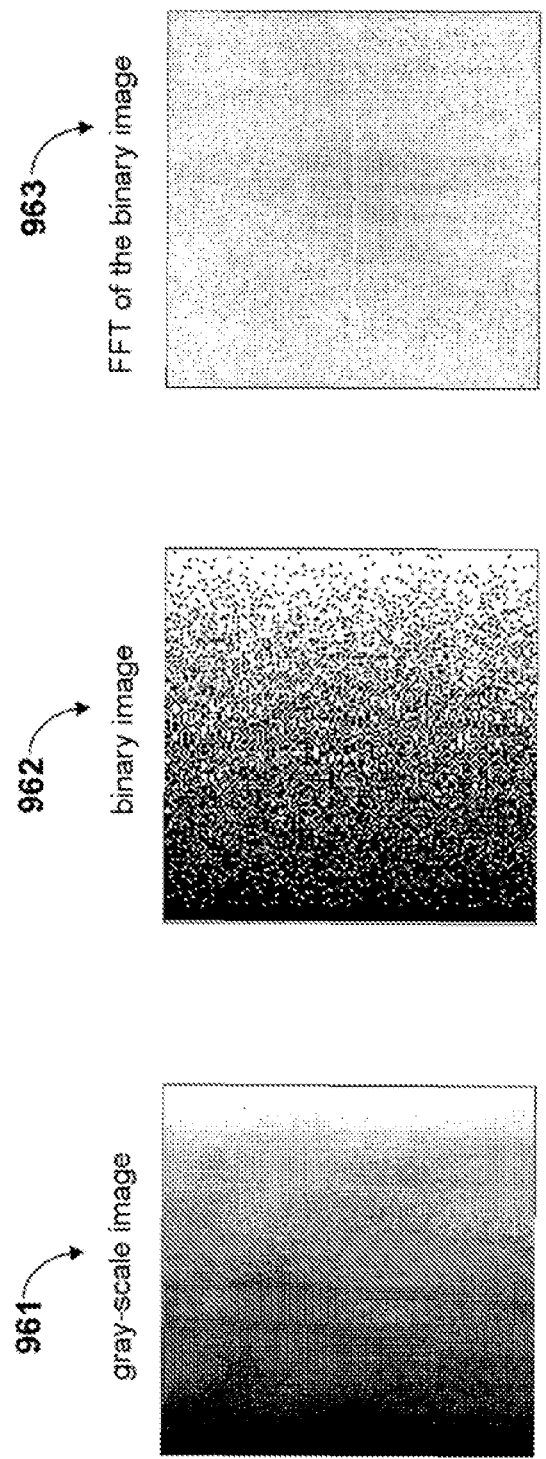

Fig. 12A
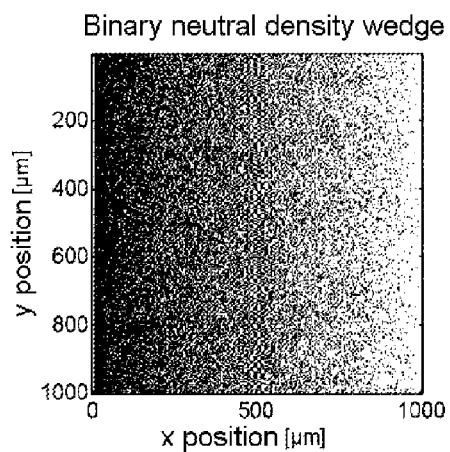
Fig. 12B
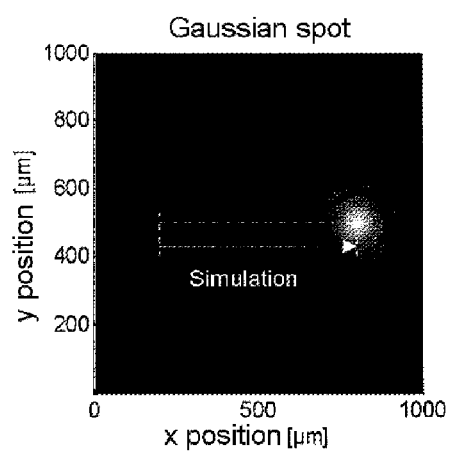
Fig. 12C
Fig. 12D
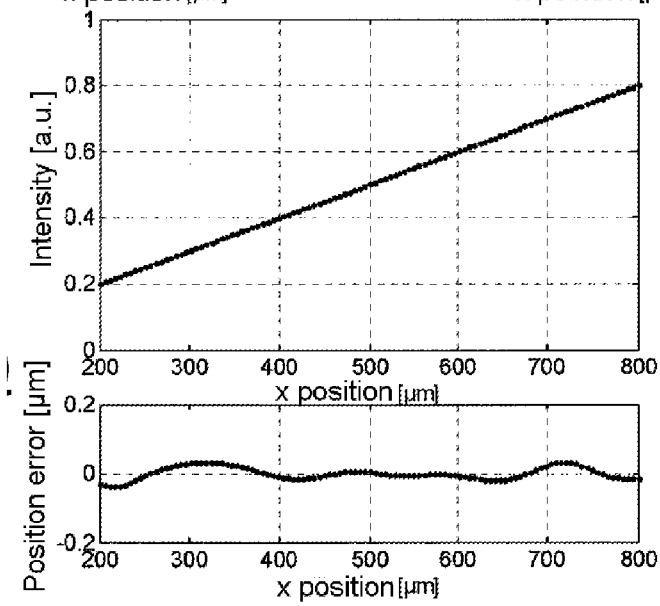

SYSTEM AND METHOD FOR ANALYZING A LIGHT BEAM GUIDED BY A BEAM GUIDING OPTICAL UNIT

CROSS REFERENCE TO RELATED APPLICATIONS

This is a Continuation of International Application PCT/EP2015/060145, which has an international filing date of May 8, 2015, and the disclosure of which is incorporated in its entirety into the present Continuation by reference. The following disclosure is also based on and claims the benefit of and priority under 35 U.S.C. §119(a) to German Patent Application No. DE 10 2014 208 792.9, filed May 9, 2014, which is also incorporated in its entirety into the present Continuation by reference.

FIELD OF THE INVENTION

The invention relates to a system and a method for analyzing a light beam guided by a beam guiding optical unit. In particular, the invention can be implemented to analyze a light beam (in particular a laser beam) e.g. in terms of the position thereof and/or in terms of the focusing properties thereof and in order to obtain information about both the geometric beam parameters and the beam quality.

In particular, the invention is suitable for analyzing electromagnetic radiation, as is used in e.g. laser plasma sources (for example in the case of an EUV source of a microlithographic projection exposure apparatus), but it is not restricted thereto. In further applications, the invention is also generally suitable for analyzing electromagnetic radiation which is used for any desired purposes (in particular measurement purposes).

BACKGROUND

By way of example, laser plasma sources are used for application in lithography. Thus, for example, the required EUV light is generated by an EUV light source based on a plasma excitation, in respect of which FIG. 14 shows an exemplary conventional setup, during the operation of a projection exposure apparatus configured for the EUV range (e.g. at wavelengths of e.g. approximately 13 nm or approximately 7 nm).

This EUV light source includes a high-energy laser (not shown here), e.g. for generating infrared radiation 706 (e.g. $CO_2$ laser with a wavelength of $\lambda \approx 10.6$ µm). The infrared radiation is focused by way of a focusing optical unit, passing through an opening 711 present in a collector mirror 710 embodied as an ellipsoid and being guided onto a target material 732 (e.g. tin droplets) which is generated by a target source 735 and supplied to a plasma ignition position 730. The infrared radiation 706 heats the target material 732 situated in the plasma ignition position 730 in such a way that the target material transitions into a plasma state and emits EUV radiation. This EUV radiation is focused by way of the collector mirror 710 onto an intermediate focus IF and enters through the latter into a downstream illumination device, the edge 740 of which is indicated merely schematically and which has a free opening 741 for the light entrance.

What is of substantial importance for the dose stability or time stability of the EUV emission characteristic achievable in an EUV light source or laser plasma source and for the realizable EUV luminous efficiency is that the tin droplets "flying into" the laser plasma source very quickly (e.g. with an injection rate in the region of 100 kHz or with a time interval of e.g. 10 µs) with increasing light requirements are hit individually in a highly precise (e.g. with an accuracy of more than 1 µm) and reproducible manner by the laser beam atomizing the droplet. In the aforementioned setup, this in turn requires highly accurate setting of the droplet position and highly accurate tracking of the infrared radiation 706 generated by e.g. the $CO_2$ laser.

Both the droplet position and the focal position of the laser beams to be tracked accordingly can be determined using a so-called beam propagation camera, wherein both the laser beams in the "forward direction" (i.e. the infrared radiation 706 prior to incidence on the respective target droplets) and the laser beams in the "backward direction" (i.e. the infrared radiation 706 reflected back from the respective target droplet) are detected and the measurement data required for the laser beam guidance and droplet guidance are obtained.

The problem occurring here in practice is that, inter alia, the infrared radiation 706 reflected back from the target droplets has a comparatively weak intensity and this makes an exact metrological detection of the droplet position, and hence also the highly accurate tracking of the infrared radiation 706 generated by the $CO_2$ laser, more difficult. With regard to the prior art, reference is made by way of example to U.S. Pat. No. 8,237,922 B2 and U.S. Pat. No. 5,329,350.

FIG. 13 serves for elucidating one possible conventional approach for light beam analysis. In this case, the light beam to be analyzed is focused by a focusing lens element 10 onto a four-quadrant sensor 20 arranged in the image-side focal plane thereof and composed of four sensors 21-24 which measure the light intensity, wherein the position of the light beam is determined from computation of the light intensities measured by the four sensors 21-24.

Here, however, in the above-described application of analyzing for instance the infrared radiation in an EUV light source or laser plasma source, in practice the problem occurs that the light beam to be measured is subjected to great variations, wherein in particular the divergence of the light beam in the case of a defocus of the light beam or laser beam with respect to the target droplet and also the direction of the light beam (corresponding to a "pointing" of the beam) change and wherein a lateral displacement of the beam additionally occurs as well.

SUMMARY

It is an object of the present invention to provide a system and a method for analyzing a light beam guided by a beam guiding optical unit which enable a light beam analysis (e.g. beam position determination) that is as exact as possible in conjunction with the least possible sensitivity to the parasitic beam variations mentioned above.

This object is achieved in accordance with the features of the independent patent claims.

A system according to the invention comprises:

a graduated neutral density filter arrangement, which is arranged in a far field plane of the beam guiding optical unit and has at least one graduated neutral density filter having spatially varying transmission; and a light intensity sensor arrangement comprising at least one light intensity sensor, which is arranged in a near field plane of the beam guiding optical unit and measures, for each graduated neutral density filter of the graduated neutral density filter arrangement, in each case the light intensity transmitted by the graduated neutral density filter.

The invention is based on the concept, in particular, of positioning a filter having spatially varying transmission—which here and hereinafter is designated as graduated neutral density filter—in the far field plane of a beam guiding optical unit, in particular in a so-called "2f-2f" construction" such as, for instance, a Kepler telescope construction, and of thus firstly translating the information (e.g. light beam position information to be determined) characterizing the light beam to be analyzed that impinges on the system into pure intensity information. The light transmitted by the graduated neutral density filter is then collected on a light intensity sensor which is arranged in the near field plane of the beam guiding optical unit and which measures exclusively the intensity as an integral over the sensor area.

What is achieved by this approach, in particular, is that the parasitic beam variations (such as e.g. divergences, etc.) mentioned in the introduction, which occur for example during the operation of an EUV light source or laser plasma source, do not have an appreciable effect at the location of the light intensity sensor arrangement. This is of great importance insofar as the intensity sensors (which may be based e.g. on a mercury cadmium tellurite material system) available in particular for the application with a wavelength of the light beam to be analyzed in the long-wave infrared range, owing to the saturation that occurs, have a pronounced nonlinear characteristic and are additionally spatially inhomogeneous as well. In this case, it proves to be particularly advantageous according to the invention that the light to be analyzed, on account of the positioning of the light intensity sensor arrangement in the optical near field (i.e. a pupil plane with the light beam collimated in this region) is sufficiently diluted or maximally widely distributed with the consequence that the above-described parasitic beam variations in the near field plane do not have an effect as variations on the light intensity sensor arrangement or do not acquire validity on the respective light intensity sensor or are suppressed at least to a sufficiently great extent.

In other words, the invention includes the concept, in particular, of realizing a light beam analysis in the long-wave infrared range, despite the only very limited availability of sensor technology in this wavelength range, by virtue of the fact that the use of a light intensity sensor (or an arrangement composed of a plurality of such light intensity sensors) that solely measures the intensity and is positioned in a near field plane is combined with the use of a graduated neutral density filter (or an arrangement composed of a plurality of graduated neutral density filters) in the field plane or far field plane and what is thus achieved is that the position determination can be carried out without the disturbances already discussed, since the disturbances are no longer active in the near field plane or at the location of the light intensity sensor.

Within the meaning of the present application, a beam guiding optical unit is understood to be an optical system which is disposed upstream of the actual system serving for analysis and feeds the light beam to be analyzed to the system serving for analysis from a superordinate system (e.g. an EUV light source or a material processing system) that generates or defines the light beam. In this case, the superordinate system already has at least one near field plane and at least one far field plane, wherein the beam guiding optical unit provides in addition respectively conjugate planes (i.e. likewise at least one near field plane and at least one far field plane), to which the system serving for analysis couples.

Near field denotes the amplitude/intensity distribution in a sectional plane perpendicular to the direction of propagation in the regime of the collimated (expanded=virtually divergence-free) beam. The far field, by contrast, corresponds to the amplitude/intensity distribution in a plane near the waist, or near the focus, perpendicular to the beam propagation in the regime of the focused or convergent beam. The generation of a focused beam from the collimated beam, and vice versa, is usually carried out via Fourier optical units. The terms "near field plane" and "far field plane" are used here analogously to the terms "pupil plane" and "field plane", respectively, of an imaging optical system.

The formulations according to which the graduated neutral density filter arrangement is arranged in a far field plane of the beam guiding optical unit and the light intensity sensor arrangement is arranged in a near field plane of the beam guiding optical unit should be understood in each case such that slight deviations from the exact arrangement in the relevant plane are also intended to be encompassed, particularly as long as the arrangement is still implemented in the respective depth of field range.

In accordance with one embodiment, the system has a first Fourier optical unit and a second Fourier optical unit in a Kepler telescope construction, wherein the far field plane of the beam guiding optical unit is situated between the first and second Fourier optical units relative to the optical beam path, and wherein the near field plane of the beam guiding optical unit is situated downstream of the second Fourier optical unit relative to the optical beam path.

In accordance with one embodiment, at least one graduated neutral density filter has a transmission profile that is linear in a predetermined spatial direction.

In accordance with one embodiment, the graduated neutral density filter arrangement has a first graduated neutral density filter having a linear transmission profile in a first spatial direction and a second graduated neutral density filter having a linear transmission profile in a second spatial direction, which differs from the first spatial direction. In this case, in particular, the second spatial direction can be perpendicular to the first spatial direction in order for instance (for a light propagation direction along the z-direction in the coordinate system) to be able to determine both the x-component and the y-component of the beam position.

In accordance with one embodiment, at least one graduated neutral density filter has a transmission profile that is parabolic at least in a predetermined spatial direction, in order—as explained in even greater detail below—to determine the spot size of the light beam to be analyzed as an alternative or in addition to the beam position.

In particular, as described in even greater detail below, a graduated neutral density filter arrangement composed of three graduated neutral density filters in combination with a light intensity sensor arrangement composed of three light intensity sensors can be used for determining the beam position, wherein (for a light propagation direction along the z-direction in the coordinate system) a first graduated neutral density filter has a transmission profile that is linear in the x-direction, a second graduated neutral density filter has a transmission profile that is linear in the y-direction, and a third of the graduated neutral density filters has a constant transmission profile for the purpose of intensity normalization.

In accordance with one embodiment, at least one graduated neutral density filter has a transmission profile having a geometry in the shape of a paraboloid of revolution or a saddle-shaped geometry.

In accordance with one embodiment, at least one graduated neutral density filter has a constant transmission profile for enabling an intensity normalization. Such an intensity normalization makes it possible to take account of possible intensity fluctuations of the light beam or laser beam and to distinguish them from the intensity fluctuations originating from a change in position of the light beam to be analyzed. This takes account of the circumstance that intensity fluctuations in the light beam to be analyzed can lead to fluctuations of the measured intensity signals and thus to corruptions of the desired position information. In order to eliminate the influence of the laser fluctuations, it is thus possible to measure a reference signal which solely represents the integral intensity, and the signals for obtaining the beam parameters of the light beam to be analyzed can be normalized to this reference signal.

However, the invention is not restricted to the use of such an (additional) graduated neutral density filter having a constant transmission profile since the intensity information of the light beam to be analyzed which is required for intensity normalization can, in principle, also be provided in some other way.

In accordance with one embodiment, the graduated neutral density filter arrangement has an array composed of a plurality of graduated neutral density filters. Furthermore, the light intensity sensor arrangement can have an array composed of a plurality of light intensity sensors.

In accordance with one embodiment, at least one graduated neutral density filter is formed from binary structures, wherein the structure sizes of the binary structures are smaller than the wavelength of the light beam to be analyzed. The formation of a graduated neutral density filter from binary structures is understood here to mean the formation from structures which are either completely absorbent or completely reflective for the respectively impinging radiation to be analyzed. What can be achieved by such a configuration is that averaged over a specific region (for instance corresponding to the spot size of the light beam to be analyzed) on average effective transmission values or gray-scale values of between 0 and 1 are obtained, whereby as a result it is possible to realize a desired transmission profile (e.g. a transmission profile that is linear in a predetermined spatial direction) with high accuracy.

This takes account of the circumstance that in the concept according to the invention comparatively stringent requirements have to be made of the quality of the graduated neutral density filter(s) used, since this directly determines the accuracy achieved in the position measurement and possible transmission profile fluctuations result in corresponding measurement errors in the beam analysis.

In accordance with one embodiment, the system has a beam splitting structure (e.g. an optical grating) for splitting the light beam to be analyzed into a plurality of partial beams. The structure are arranged upstream of the graduated neutral density filter arrangement relative to the light propagation direction, whereby the light beam to be analyzed can firstly be replicated in partial beams having corresponding optical properties, wherein the partial beams can then be analyzed by the respective downstream graduated neutral density filter/light intensity sensor combinations separately in order to determine different items of beam information. In further configurations, the beam splitting structure can also have one or more prisms or mirrors. The beam splitting (e.g. diffractive) structure is preferably arranged in a near field plane of the beam guiding optical unit.

In accordance with one embodiment, the light beam to be analyzed is a laser beam, in particular a laser beam having a wavelength in the infrared range.

The invention furthermore also relates to a method for analyzing a light beam guided by a beam guiding optical unit, wherein a light beam to be analyzed is directed via a graduated neutral density filter arrangement, which is arranged in a far field plane of the beam guiding optical unit and at least one graduated neutral density filter having spatially varying transmission, onto a light intensity sensor arrangement having at least one light intensity sensor, which is arranged in a near field plane of the beam guiding optical unit and measures, for each graduated neutral density filter of the graduated neutral density filter arrangement, in each case the light intensity transmitted by the graduated neutral density filter;

wherein at least one beam parameter for characterizing the light beam to be analyzed is derived from the measured light intensity.

In accordance with a further aspect, the invention also relates to the use of a graduated neutral density filter for light beam analysis, in particular in a system having the features described above, wherein the graduated neutral density filter is formed from binary structures, and wherein the structure sizes of the binary structures are smaller than the wavelength of a light beam to be analyzed.

Further configurations of the invention can be gathered from the description and the dependent claims.

The invention is explained in greater detail below on the basis of exemplary embodiments illustrated in the accompanying figures.

BRIEF DESCRIPTION OF THE DRAWINGS

In the figures:

FIGS. 4A-4I show schematic illustrations for elucidating respectively different graduated neutral density filters that are usable in the context of the present invention;

FIGS. 6A-6C, 7, 8A-8D, 9A-9C, and 10 show schematic illustrations for elucidating further respective embodiments of graduated neutral density filters that are usable in the context of the present invention;

FIGS. 11A-11C and 12A-12D show schematic illustrations for elucidating respective concrete embodiments of a graduated neutral density filter having sublambda binary structures that are usable in the context of the present invention;

DETAILED DESCRIPTION

Figure 1:
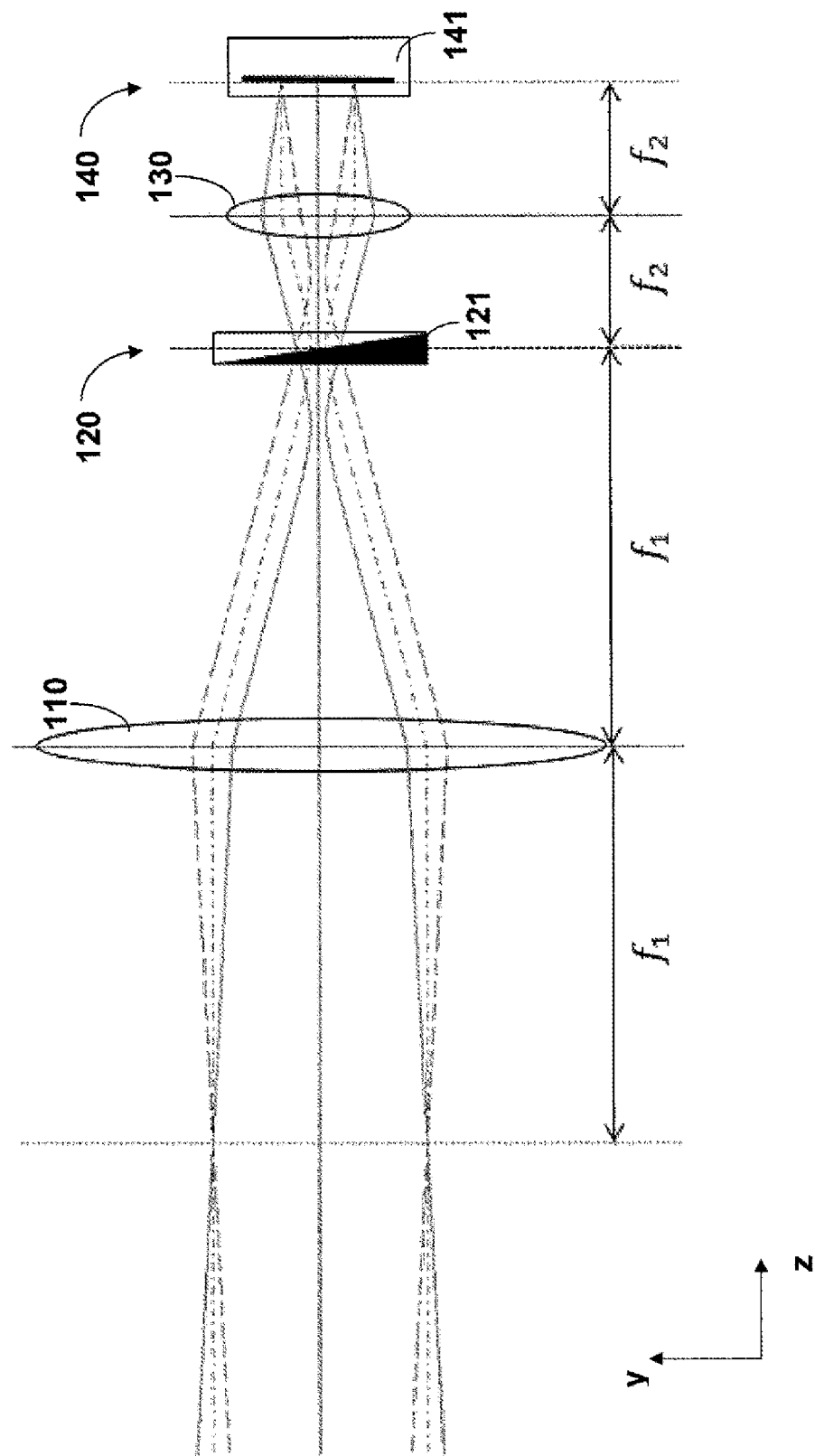
FIG. 1 shows a schematic illustration for elucidating the principle underlying the present invention.

FIG. 1 shows a schematic illustration for elucidating the principle underlying the present invention and the basic construction of a system for beam analysis according to the invention.

In accordance with FIG. 1, a collimated beam firstly impinges, along the z-direction in the depicted coordinate system, on a first Fourier optical unit 110 and, in a manner focused by the latter, on a graduated neutral density filter arrangement 120, which is arranged in the optical beam path in a far field plane of the beam guiding optical unit (sometimes also designated as "spatial filter plane") and, in the exemplary embodiment illustrated, has an individual graduated neutral density filter 121 having a transmission profile that is linear in the y-direction (and is merely indicated schematically by a wedge). The radiation transmitted through the graduated neutral density filter arrangement 120 or the graduated neutral density filter 121 passes through a second Fourier optical unit 130 onto a light intensity sensor arrangement 140, which is arranged in a near field plane of the beam guiding optical unit and, in the exemplary embodiment, has an individual light intensity sensor 141, which measures an intensity value integrated over the entire sensor area.

The invention is not restricted to a concrete configuration with regard to the Fourier optical units 110, 130, wherein in particular refractive, diffractive, diffractive-multifocal or reflective embodiments are possible. If appropriate, the second Fourier optical unit 130 can also be omitted given sufficient uniformity of the light intensity sensor 141.

The invention is furthermore not restricted to a specific embodiment with regard to the configuration of the light intensity sensor arrangement 140 or the light intensity sensor 141, wherein the light intensity sensor 141 can be configured e.g. in photovoltaic, photoconductive, pyro-electromagnetic or else thermal or bolometric fashion.

The graduated neutral density filter(s) 121 of the graduated neutral density filter arrangement 120 can be configured as an area absorber or volume absorber (e.g. wedge) if appropriate also in retroreflective fashion, with regard to the attenuation principle.

The arrangement of the graduated neutral density filter 141 (in accordance with FIG. 1 in the "intervention plane" of a Kepler telescopic group) advantageously has the consequence that for the positioning of the light intensity sensor 141 a near field plane becomes accessible which is distinguished inter alia by the fact that the shape and size of the "intensity structure" present there are independent of beam direction and beam divergence given correct a focal coupling in the optical beam path and in addition the energy of the electromagnetic radiation is present in a sufficiently diluted manner with avoidance of local saturation effects. Consequently, all main interference sources are either—as in the case of beam direction and divergence—eliminated or—as in the case of beam decentration and variation of the beam size—at least sufficiently suppressed, such that disturbing artefacts of the light intensity sensor (in particular the spatial inhomogeneity and saturation thereof) do not acquire validity or do so only to a significantly reduced extent.

By virtue of the integrating effect of the light intensity sensor arrangement 140 or of the light intensity sensor 141, the sensor signal S supplied by the light intensity sensor arrangement 140 results as $$S = \int_{-\infty}^{+\infty} dxdy I_{FF}(x, y) T(x, y) \quad (1)$$

as a result of integration—weighted with the transmission function T(x, y)—over the intensity distribution $I_{FF}(x, y)$ present in the far field (Fourier plane of the input lens element). The integration limits are chosen under the assumption that the intensity of the radiation or of the "light structure" falls spatially sufficiently rapidly. Through suitable selection of the transmission profile T(x, y) for example the moments $$m_{k,l} = \int_{-\infty}^{+\infty} dxdy I_{FF}(x, y) x^k y^l \quad (2)$$

of the light distribution can be made directly metrologically accessible.

The principle according to the invention was initially described above for a construction comprising just one pair comprising one graduated neutral density filter and one light intensity sensor, for the sake of simplicity. In order to determine the (complete, i.e. defined in all three spatial directions) beam position of the light beam to be analyzed, it is possible, as described below low with reference to FIGS. 5A-5B, to use a graduated neutral density filter arrangement 520 composed of three graduated neutral density filters 521-523 in combination with a light intensity sensor arrangement 540 composed of three light intensity sensors 541-543, wherein a first of the graduated neutral density filters 521 has a transmission profile that is linear in the y-direction relative to the coordinate system depicted, a second of the graduated neutral density filters 523 has a transmission profile that is linear in the y-direction, and a third of the graduated neutral density filters 522 has a constant transmission profile for the purpose of intensity normalization.

Furthermore, there is the possibility of also detecting e.g. the spot size or higher moments of the radiation to be analyzed, wherein a graduated neutral density filter having a parabolic transmission profile can be used e.g. for spot size determination, as will be explained in even greater detail.

Referring to FIG. 5A again, a collimated beam firstly impinges, along the z-direction in the depicted coordinate system, on a diffractive structure or an optical grating 505, which replicates the beam in partial beams which are only spatially separated from one another and for the rest have identical optical beam properties with respect to one another and. In accordance with FIGS. 5A-5B, this replication is effected in the three orders of diffraction "+1", "0" and "−1". The design is preferably chosen here such that the partial beams having a maximum diameter $d_{max}$ and subjected to the maximum position variation $r_{max}$ (in each case relative to the far field plane) are separated in such a way that a disturbing interaction owing to interference effects is avoided.

Figure 5B:
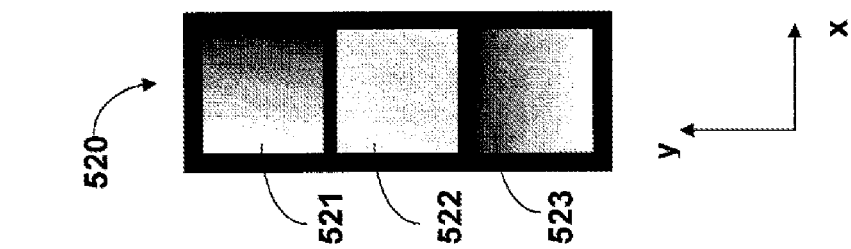
FIGS. 5A-5B show respective schematic illustrations for elucidating possible constructions of a system according to the invention comprising a graduated neutral density filter arrangement in a concrete embodiment.

In accordance with the separation of the partial beams that is achieved by the optical grating 505, the graduated neutral density filter arrangement 520 has an (e.g. monolithic) arrangement of graduated neutral density filters 521-523 (neutral density filter array) which can be designed as indicated in plan view in FIG. 5B. Furthermore, in accordance with FIG. 5A, the output-side Fourier optical unit 130 and also the light intensity sensor 140 from FIG. 1 are replaced by an (e.g. likewise monolithic) arrangement of a plurality of Fourier optical units (in the form of a lens element array) 531-533 and respectively an arrangement of a plurality of light intensity sensors 541-543.

A description is given below of the signal generation and the determination of the position information sought for the configuration illustrated in FIG. 5A for position measurement with three graduated neutral density filters 521-523 ("neutral density filter channels").

The transmission profile of a graduated neutral density filter having a linear transmission profile is parameterized here by $$T(s) = \frac{1}{2} + \frac{s - s_0}{W}. \quad (3)$$

In that, s denotes the position coordinate in the profile direction, $s_0$ denotes the position of the transmission value ½ and W denotes the width of the zone of the complete rise in transmission from the value zero to the value one.

Figure 5A:
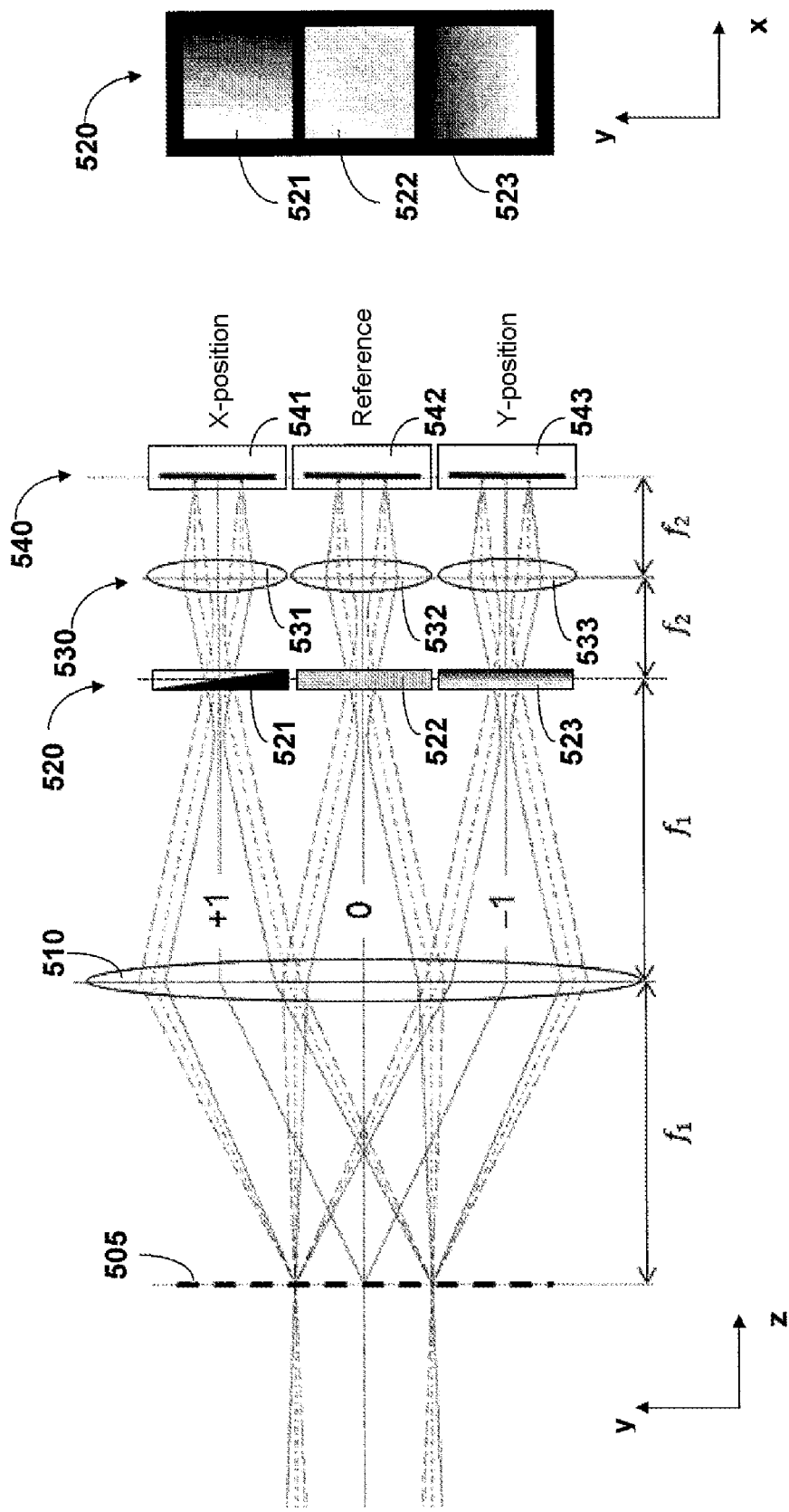

Therefore, the signals $S_1$ to $S_3$ of the three measurement channels (corresponding to the three graduated neutral density filters 521-523 and light intensity sensors 541-543 of the configuration from FIG. 5A) result as $$S_1 = \eta_1 \int_{-\infty}^{+\infty} dxdy I_{FF}(x, y) \left[\frac{1}{2} + \frac{x - x_0}{W_x}\right], \quad (4)$$

$$S_2 = \eta_2 \int_{-\infty}^{+\infty} dxdy I_{FF}(x, y) \left[\frac{1}{2} + \frac{y - y_0}{W_y}\right],$$

$$S_3 = \eta_3 \frac{1}{2} \int_{-\infty}^{+\infty} dxdy I_{FF}(x, y).$$

The parameters $W_x$ and $W_y$ and also $x_0$ and $y_0$ characterize the two graduated neutral density filters 521, 523 having a linear transmission profile. The parameters $\eta_1$ to $\eta_3$ denote the detection sensitivities of the channels, which can vary for a variety of reasons (e.g. component fluctuations, etc.).

Energy fluctuations (laser pulse fluctuations) are eliminated by normalization to a reference signal, which here is obtained by a uniform graduated neutral density filter 522 having a constant transmission profile (e.g. having the transmission ½). The two normalized signals then contain the centroid information for the light beam to be analyzed and read:

$$\frac{S_1}{S_3} = \underbrace{\frac{\eta_1}{\eta_3}\left(1 - 2\frac{x_0}{W_x}\right)}_{C_x} + \underbrace{\frac{\eta_1}{\eta_3}\frac{1}{W_x}}_{G_x}\overline{x} = C_x + G_x\overline{x}, \quad (5)$$

$$\frac{S_2}{S_3} = \underbrace{\frac{\eta_2}{\eta_3}\left(1 - 2\frac{y_0}{W_y}\right)}_{C_y} + \underbrace{\frac{\eta_2}{\eta_3}\frac{1}{W_y}}_{G_x}\overline{y} = C_y + G_y\overline{y}.$$

The design parameters can be combined therein to form four effective parameters, two offset values $C_x$ and $C_y$, and also two gain values $G_x$ and $G_y$, which can be determined by calibration, for example, and are therefore designated as calibration parameters hereinafter.

By rearranging the equation with knowledge of the four calibration parameters, the centroid positions finally result from the measurement signals as $$\overline{x} = \frac{1}{G_x}\left(\frac{S_1}{S_3} - C_x\right), \quad (6)$$

$$\overline{y} = \frac{1}{G_y}\left(\frac{S_2}{S_3} - C_y\right).$$

Figure 2:
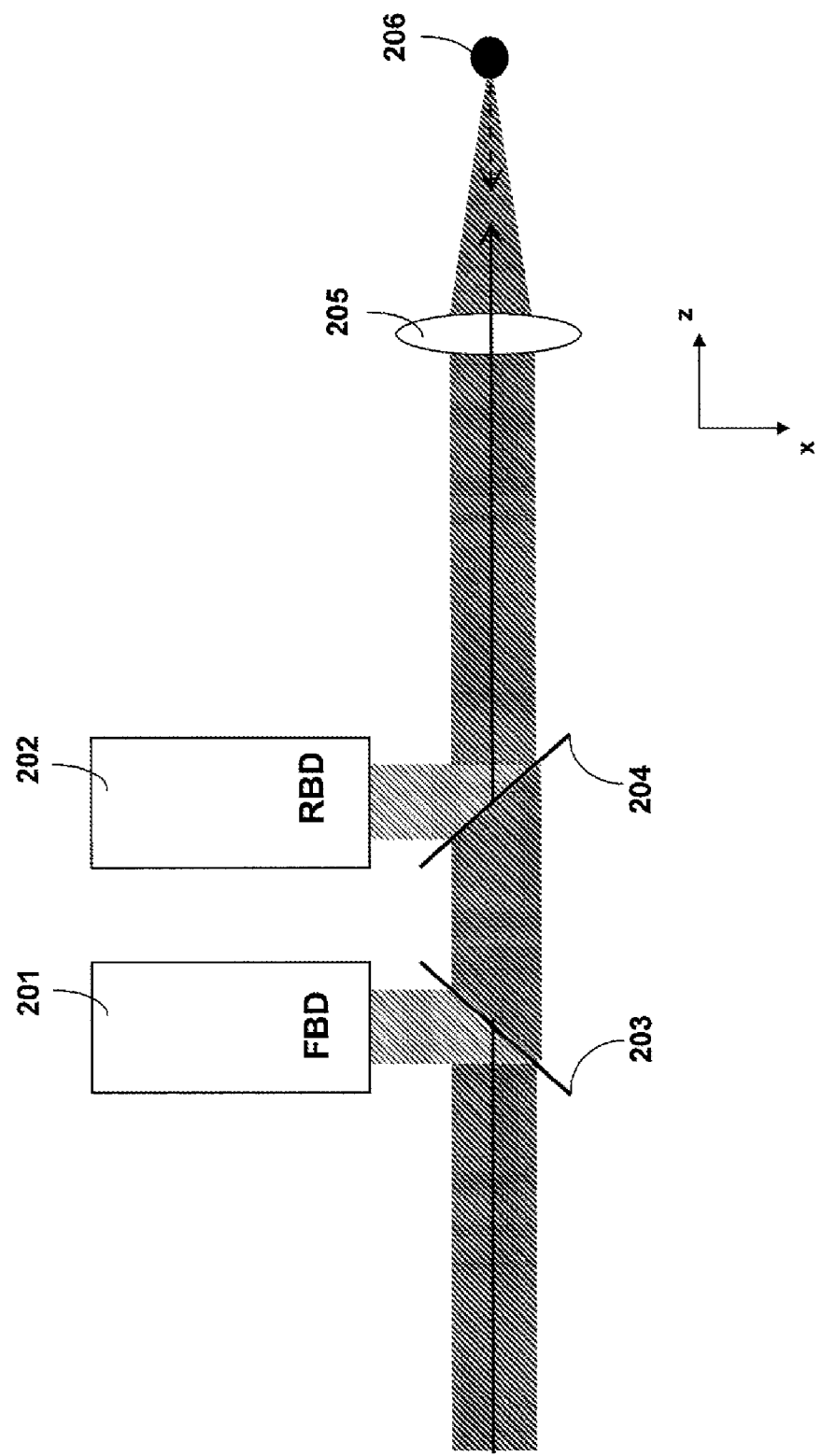
FIGS. 2-3 show schematic illustrations of respective basic constructions that are possible in a laser plasma source both for determining the target droplet position and for analyzing the laser beams to be correspondingly tracked.
Figure 14:
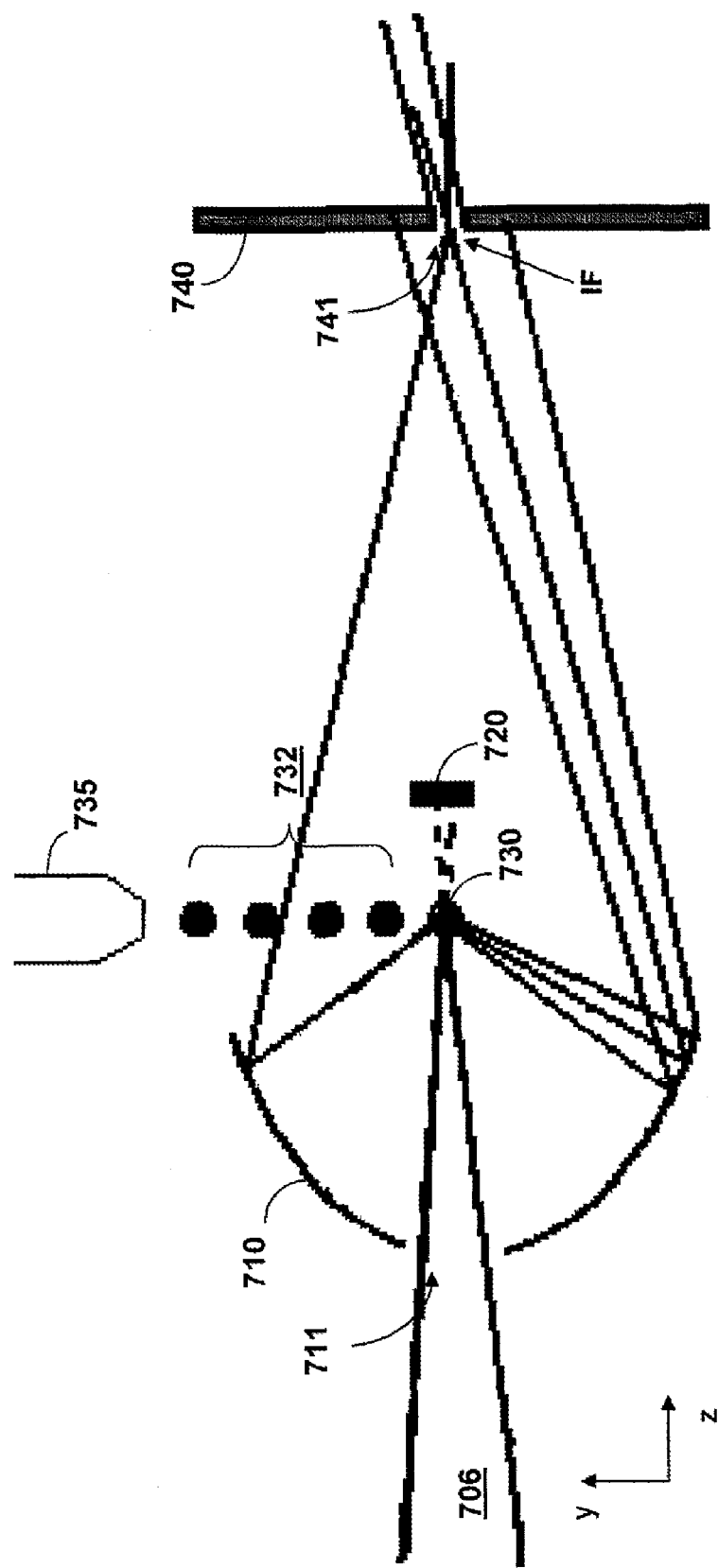
FIG. 14 shows a schematic illustration of the basic construction of an EUV light source in accordance with the prior art.

The systems for light beam analysis described above with reference to FIG. 1 and FIG. 5A, respectively, can be used in particular in a laser plasma source (such as e.g. that in FIG. 14) both for determining the target droplet position and for analyzing the laser beams to be corresponding tracked for a possible basic construction, for which purpose FIG. 2 shows a schematic illustration of one possible, basic overall construction. Both laser beams in the "forward direction" (before impinging on the respective target droplet) and laser beams in the "backward direction" (i.e. the infrared radiation reflected back from the respective target droplet) are evaluated in this case.

In accordance with FIG. 2, part of the incident laser beam having a Gaussian profile is coupled out at a first partly transmissive mirror 203 and analyzed by a first analysis unit 201, which can have in particular a system analogous to FIG. 1 or FIG. 5A. That part of the incident laser beam which passes through the partly transmissive mirror 203 and a further partly transmissive mirror 204 passes via a focusing optical unit 205 to a metallic target droplet 206 (e.g. a tin droplet), where part of the laser beam is reflected back and returns to the partly transmissive mirror 204 in a manner collimated via the focusing optical unit 205. At the partly transmissive mirror 204, part of the laser beam is in turn coupled out toward a second analysis unit 202, which can likewise have in particular a system analogous to FIG. 1 or FIG. 5A. Moreover, beam traps (not depicted in FIG. 2) for capturing the respectively unused portion of the radiation incident on the partly transmissive mirror 203 or 204 may be provided.

Figure 3:
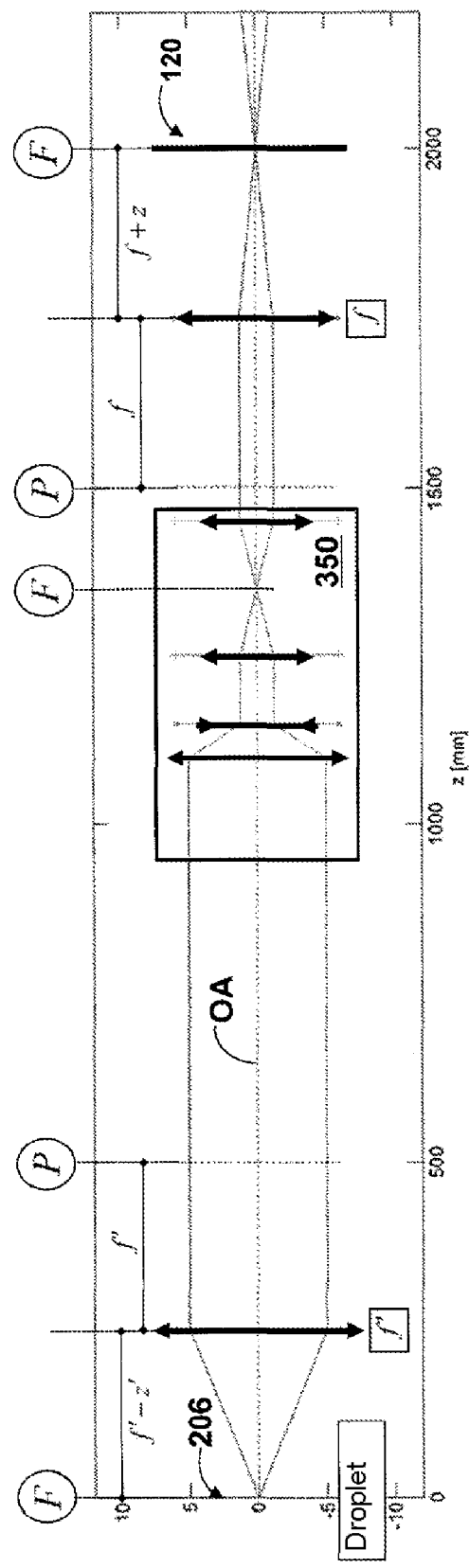

A schematic beam path for analyzing the laser beam in the "backward direction" is illustrated in FIG. 3, with the field planes being denoted by "F" and the pupil planes being denoted by "P" in each case. "206" in FIG. 3 denotes the metallic target droplet, "350" is an a focal telescope group, and "120" represents the graduated neutral density filter arrangement described with reference to FIG. 1 (with a downstream second Fourier optical unit and light intensity sensor arrangement, not illustrated, however, in FIG. 3). A displacement of the position of the target droplet 206 results in a change in the measurement result obtained with the light intensity sensor arrangement.

Thus, the analysis of the laser beams both in the "forward direction" (laser beam prior to incidence on the respective target droplet 206, denoted as "forward beam" below) and in the "backward direction" (laser beam after the reflection at the respective target droplet 206, denoted as "backward beam" below) allows a statement to be made about the relative setting of the laser beam and target droplet 206 in relation to one another, wherein—with reference again being made to FIG. 1—the setting or focal position of the laser beam can be deduced from the result obtained with the first analysis unit 201 and the droplet position can be deduced from the result obtained with the second analysis unit 202.

Some principles of a focal imaging are explained below as background. According to the transfer matrix formalism (ABCD matrix) customary in paraxial optics, the imaging matrix of the concatenated beam path in accordance with FIG. 3 results from multiplication of the partial section matrices in accordance with $$\underline{M} = \underbrace{\begin{pmatrix} 1 & f+z \\ 0 & 1 \end{pmatrix} \begin{pmatrix} 1 & 0 \\ -\frac{1}{f} & 1 \end{pmatrix} \begin{pmatrix} 1 & f \\ 0 & 1 \end{pmatrix}}_{\substack{\text{Image-side lens element} \\ (\text{from Fourier plane to sensor plane})}} \quad (7)$$

$$\underbrace{\begin{pmatrix} mag & 0 \\ 0 & \frac{1}{mag} \end{pmatrix}}_{\text{Telescope}} \underbrace{\begin{pmatrix} 1 & f' \\ -\frac{1}{f'} & 1 \end{pmatrix} \begin{pmatrix} 1 & f'-z' \\ 0 & 1 \end{pmatrix}}_{\substack{\text{Object–side lens element} \\ (\text{from object plane to Fourier plane})}}$$

The object- and image-side focal lengths f' and f and also the telescope imaging scale mag become clear with reference to FIG. 3 (object space designated with prime symbol, image space without prime symbol), and the positions z' and z relate to the focal plane of the respective Fourier optical unit. The transfer matrix conveys the transformation of the ray vectors defined by the ray position x and the ray angle u≈tan(u) between object space ray'=(x', u') and image space ray=(x, u) in accordance with $$\begin{pmatrix} x \\ u \end{pmatrix} = \underline{M} \begin{pmatrix} x' \\ u' \end{pmatrix} \quad (8)$$

where $$\underline{M} = \begin{pmatrix} -Mag & Mag\ z' - \frac{1}{Mag}z \\ 0 & -\frac{1}{Mag} \end{pmatrix}$$

wherein $$Mag = \frac{f}{f'\ mag} \quad (20)$$

denotes the imaging scale of the far field imaging.

A sharp imaging is present if all rays proceeding from an object point are combined at an image point independently of the ray angle. Accordingly, the focus condition reads $$M_{12} = \frac{\partial x}{\partial u'} = -\frac{1}{Mag}z + Mag\ z' \stackrel{!}{=} 0 \quad (9)$$

The imaging condition z=Mag²z' follows directly therefrom.

It is assumed that a conical beam emanating from an object point at the location (x', y', z') is delimited on the object side by its marginal rays eray'=(x', ū'+θ' sin(φ), y', v̄'+θ cos(φ)), wherein ū' and v̄' denote the centroid ray angle and θ denotes the aperture or divergence angle. The propagation of the beam through the imaging optical unit with the image sensor at the position z=0 (in the focal plane of the image-side Fourier optical unit) reads in accordance with the transfer matrix formalism (extended by the direction perpendicular to the propagation direction)

$$\underline{eray} = \begin{pmatrix} \underline{M} & 0 \\ 0 & \underline{M} \end{pmatrix} \underline{eray'}\ mit\ \underline{M} = \begin{pmatrix} -Mag & mag\ z' \\ 0 & -\frac{1}{Mag} \end{pmatrix} \quad (10)$$

The geometric-optical imaging equations finally result therefrom as $$\bar{x} = -Mag(x' - z'\bar{u}'), \quad (11a)$$
$$\bar{y} = -Mag(y' - z'\bar{v}')$$
$$\bar{u} = -\frac{1}{Mag}\bar{u}', \quad (11b)$$
$$\bar{v} = -\frac{1}{Mag}\bar{v}'$$
$$\theta = -\frac{1}{Mag}\theta' \quad (11c)$$
$$z = Mag^2 z' \quad (11d)$$

The bar above the symbol in this case indicates the centroid ray.

In principle, depending on the case, different conventions are possible and conventional for the beam dimension measure and the divergence measure. In the field of laser technology for example, the moments $$w_x^2(z) = \frac{\int_{-\infty}^{+\infty} dxdy I(x, y; z)(x - \bar{x}(z))^2}{\int_{-\infty}^{+\infty} dxdy I(x, y; z)}, \quad (12)$$

$$w_y^2(z) = \frac{\int_{-\infty}^{+\infty} dxdy I(x, y; z)(y - \bar{y}(z))^2}{\int_{-\infty}^{+\infty} dxdy I(x, y; z)}$$

with $$\bar{x}(z) = \frac{\int_{-\infty}^{+\infty} dxdy I(x, y; z)x}{\int_{-\infty}^{+\infty} dxdy I(x, y; z)}, \quad (13)$$

$$\bar{y}(z) = \frac{\int_{-\infty}^{+\infty} dxdy I(x, y; z)y}{\int_{-\infty}^{+\infty} dxdy I(x, y; z)}$$

often serve as a basis of a beam dimension definition in accordance with $$w(z) = \sqrt{w_x^2(z) + w_y^2(z)} \quad (14)$$

or $$w(z) = \sqrt[4]{w_x^2(z)w_y^2(z)} \quad (15)$$

Here, I(x, y; z) denotes the light intensity for the selected sectional plane.

With the definition of moments in accordance with equation (2), the centroid (x̄, ȳ) and the beam dimension parameters $w_x^2$, $w_y^2$, $w^2 = w_x^2 + w_y^2$ result as follows:

$$\bar{x} = \frac{m_{1,0}}{m_{0,0}}, \quad (16)$$

$$\bar{y} = \frac{m_{0,1}}{m_{0,0}},$$

$$w_x^2 = \frac{m_{2,0}}{m_{0,0}} - \bar{x}^2 = \frac{m_{2,0}}{m_{0,0}} - \left(\frac{m_{1,0}}{m_{0,0}}\right)^2,$$

$$w_y^2 = \frac{m_{0,2}}{m_{0,0}} - \bar{y}^2 = \frac{m_{0,2}}{m_{0,0}} - \left(\frac{m_{0,1}}{m_{0,0}}\right)^2,$$

$$w^2 = w_x^2 + w_y^2 = \frac{m_{2,0}}{m_{0,0}} + \frac{m_{0,2}}{m_{0,0}} - \left(\frac{m_{1,0}}{m_{0,0}}\right)^2 - \left(\frac{m_{0,1}}{m_{0,0}}\right)^2.$$

When analyzing the forward beam and the backward beam in the basic construction from FIG. 2, it should be noted that only the forward beam should be considered in an idealized manner as a "Gaussian beam", for which, in the region of the image-side focus, the following applies to a good approximation for the beam dimension w as a function of the propagation coordinate z $$w(z) = \sqrt{w_0^2 + \theta^2(z - z_0)^2} \quad (17)$$

where $w_0$ denotes the waist size, θ denotes the divergence and $z_0$ denotes the waist position (focal position).

Below, problems are briefly discussed, which, for example in the case of analyzing the backward beam in the second analysis unit 120, emerge from the fact that the beam to be examined is not an ideal Gaussian beam but rather a comparatively sharply delimited beam (also referred to as "top hat" beam below). In the case of such a sharply delimited beam, an Airy light distribution emerges in the focus (far field) and in the aberration-free ideal case:

$$I(r = \sqrt{x^2 + y^2}, z = z_0) = \pi P \left(\frac{1}{L_c}\right)^2 \left[\frac{2 J_1\left(2\pi \frac{r}{L_c}\right)}{2\pi \frac{r}{L_c}}\right]^2 \quad (18)$$

where $$L_c = \frac{\lambda}{NA}$$

denotes the characteristic length, P denotes the entire power transmitted through the system and $J_1(x)$ denotes the first order Bessel function. However, the moments in accordance with equation (12) are not defined due to the asymptotic decrease $$I(r, z = z_0) \propto \frac{1}{r^2}$$

in this light distribution. The problem of also evaluating the backward beam with a "hard delimitation" resulting herefrom can be overcome by a suitable "artificial" apodization: In one embodiment, an (in the above sense "soft") apodization $$u(x,y;z_{NF})\theta(x^2+y^2 \leq R_{NA}) \rightarrow u(x,y;z_{NF}) A_{R_{NA}}(x,y) \quad (19)$$

can be realized by introducing a structured neutral density filter with a corresponding profile into the near field or into a pupil plane. Here, u(x, y; z) denotes the beam amplitude (which determines the intensity by way of $I(x, y; z) = |u(z, y; z)|^2$) and $R_{NA}$ denotes the aperture radius (defining the opening or numerical aperture NA). What is suitable for this purpose is, for example, the function (which is discontinuous only starting from the second derivatives)

$$A_R(x, y) = \frac{1}{2}\left(1 + \cos\left(\pi \frac{\sqrt{x^2 + y^2}}{R}\right)\right) \quad (20)$$

with the cutoff radius R in the range around $R_{NA}$.

Various possible embodiments and transmission profiles of graduated neutral density filters that can be used according to the invention are described in greater detail below with reference to FIG. 6ff.

Figure 6C:
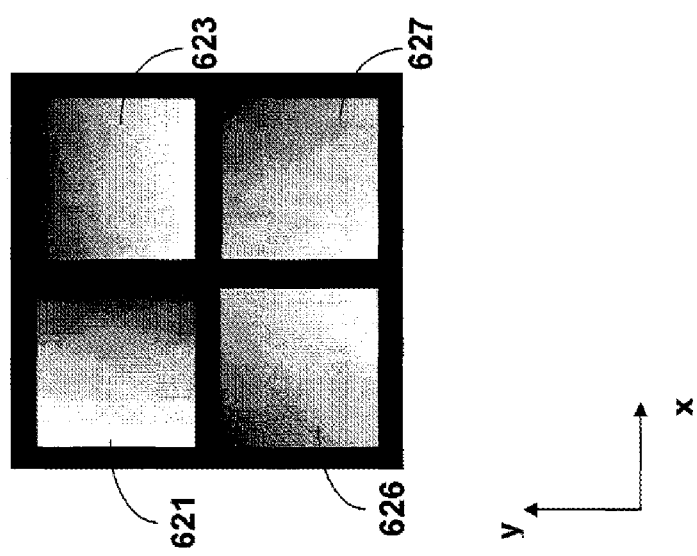
Figure 6B:
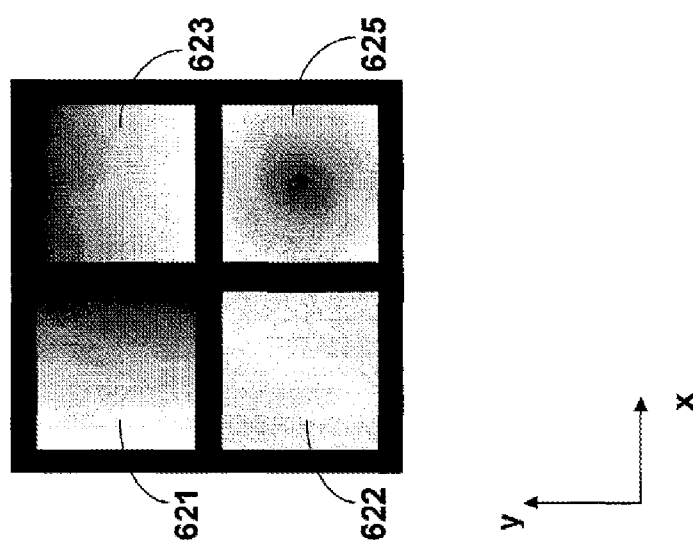
Figure 6A:
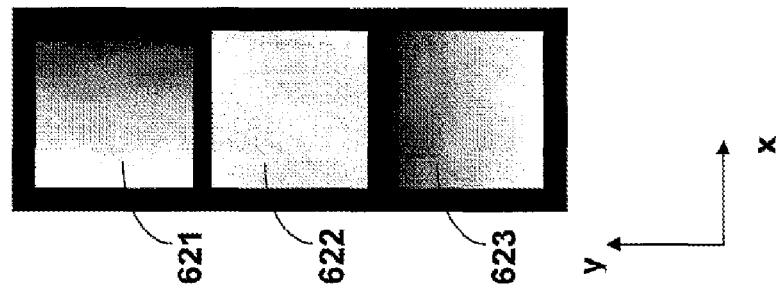

FIG. 6A shows a linear arrangement of three graduated neutral density filters 621-623, such as is used in the construction from FIG. 5A. FIG. 6B shows a 2-D arrangement comprising four graduated neutral density filters (or "channels"), which is folded (e.g. with regard to existing structural space restrictions) and which has, over and above the graduated neutral density filters 621-623 from FIG. 6A, an additional graduated neutral density filter 625 (for the purpose of a spot size measurement or an adjustment), which is radially parabolic in terms of its transmission profile. FIG. 6C shows a redundant folded 2-D arrangement having, in addition to two graduated neutral density filters 621, 623 having a transmission profile that is linear in the x- and y-direction, respectively, two graduated neutral density filters 626, 627 having a transmission profile that is linear in a diagonal (45°) direction with respect thereto. In FIG. 6C, the graduated neutral density filter 622 having a constant transmission profile is dispensed with, it being assumed that the signal for intensity normalization is available in some other way. FIG. 7 illustrates the arbitrary arrangement of graduated neutral density filters proceeding from a linear arrangement to give a 2D matrix arrangement.

By using pairwise opposite graduated neutral density filters (or "graduated wedge filters"), it is likewise possible to derive an energy normalization. This is explained briefly below for the graduated neutral density filter arrangement 821 shown by way of example in FIG. 8A, which has in each case two transmission profiles that are linear in positive and negative x- and y-directions, respectively, for measuring the focal position coordinates of a laser beam to be characterized.

Figures 8A, 8B, 8C, 8D:
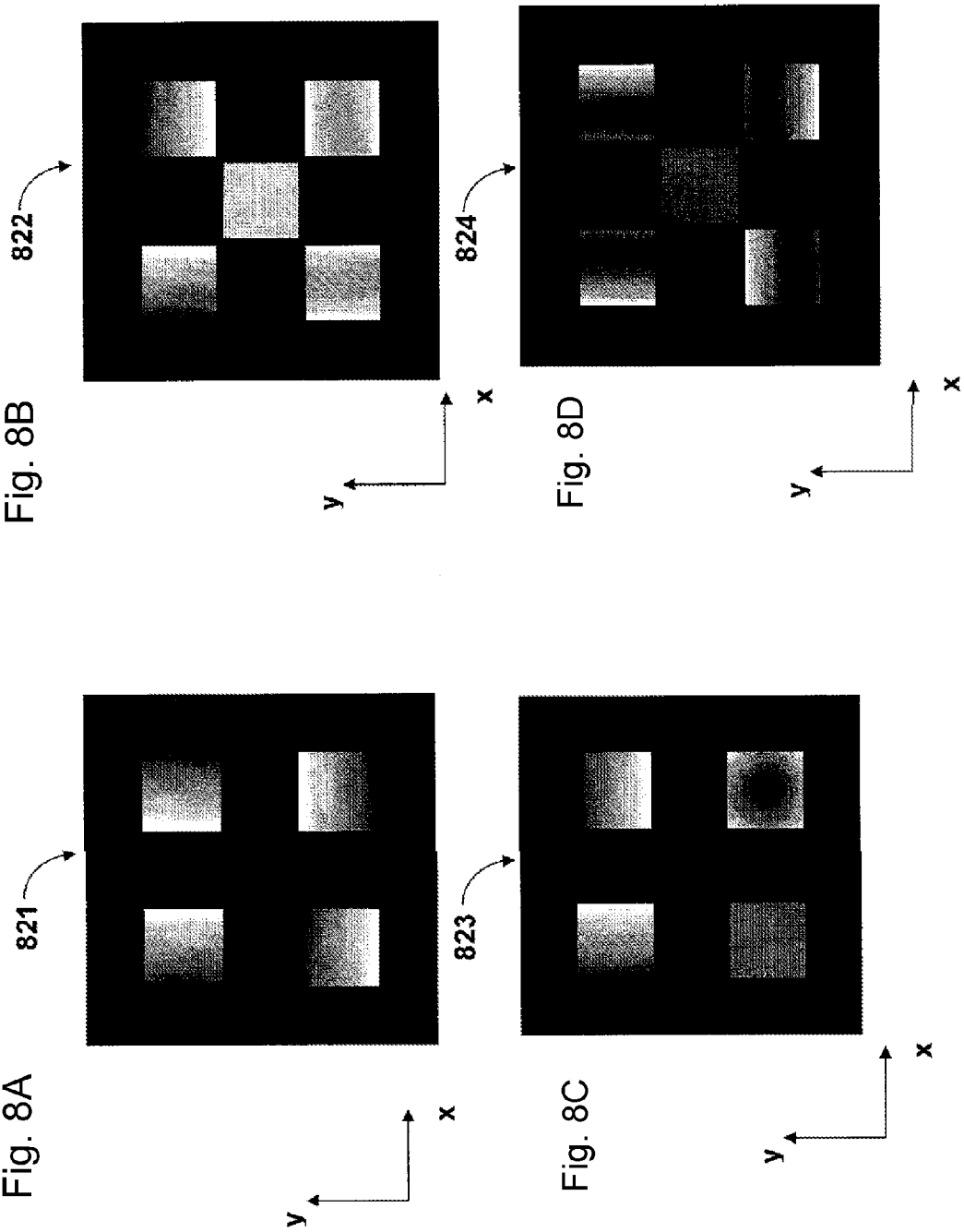

For the exemplary embodiment in FIG. 8A, the sensor signals result as:

$$S_1 = G\left[\frac{I}{2} + I\frac{\bar{x} - x_1}{W}\right], \quad (21)$$

$$S_2 = G\left[\frac{I}{2} - I\frac{\bar{x} - x_1}{W}\right],$$

$$S_3 = G\left[\frac{I}{2} + I\frac{\bar{y} - y_3}{W}\right],$$

$$S_4 = G\left[\frac{I}{2} - I\frac{\bar{y} - y_3}{W}\right].$$

In order to explain the principle more simply, a uniform gain value G and also a uniform ("wedge") width W of the linear transmission profile are assumed for all the graduated neutral density filters. The "wedge displacements" $x_1$ and $y_3$ are likewise chosen identically in pairs. I denotes the total intensity integrated over the light structure $$I = m_{0,0} = \int_{-\infty}^{+\infty} dx dy I_{FF}(x, y). \quad (22)$$

Addition and subtraction result in $$S_1 + S_2 = GI, \quad (23)$$

$$S_1 - S_2 = 2GI\frac{\bar{x} - x_1}{W},$$

$$S_3 + S_4 = GI,$$

$$S_3 - S_4 = 2GI\frac{\bar{y} - x_y}{W}.$$

The two summation signals "$S_1+S_2$" and "$S_3+S_4$" respectively result in the total intensity in accordance with equation system (23). The total intensity can be used for normalizing the two difference signals, in order finally to extract the desired centroid positions.

Second-order graduated neutral density filters having a parabolic transmission profile afford the possibility of measuring the second moments of the light distribution and thus the size of the light beam to be analyzed (or of the "light structure"). The profile of a graduated neutral density filter having a parabolic transmission profile is parameterized by the transmission function $$T(s) = \left(\frac{s - s_0}{W}\right)^2. \tag{24}$$

In that, s denotes the position coordinate in the profile direction, $s_0$ denotes the position of the vertex and W denotes the width of the region over which the complete rise in the transmission coefficient from the value zero to the value one takes place.

FIG. 8B shows by way of example and schematically a configuration of a graduated neutral density filter arrangement 822 comprising five graduated neutral density filters (or "measurement channels"), which has a graduated neutral density filter having a linear transmission profile in the x-direction, a graduated neutral density filter having a linear transmission profile in the y-direction, a uniform graduated neutral density filter having a constant transmission profile as reference, a graduated neutral density filter having a transmission profile that is parabolic in the x-direction, and a graduated neutral density filter having a transmission profile that is parabolic in the y-direction. For this design, the signals $S_1$ to $S_5$ result as:

$$S_1 = \eta_1 \int_{-\infty}^{+\infty} dx dy I_{FF}(x, y) \left[\frac{1}{2} + \frac{x - x_1}{W_1}\right], \tag{25}$$

$$S_2 = \eta_2 \int_{-\infty}^{+\infty} dx dy I_{FF}(x, y) \left[\frac{1}{2} + \frac{y - y_2}{W_2}\right],$$

$$S_3 = \eta_3 \frac{1}{2} \int_{-\infty}^{+\infty} dx dy I_{FF}(x, y),$$

$$S_4 = \eta_4 \int_{-\infty}^{+\infty} dx dy I_{FF}(x, y) \left(\frac{x - x_4}{W_4}\right)^2,$$

$$S_5 = \eta_5 \int_{-\infty}^{+\infty} dx dy I_{FF}(x, y) \left(\frac{y - y_5}{W_5}\right)^2.$$

The parameters $W_1$, $W_2$, $W_4$ and $W_5$ and also $x_1$, $y_2$, $x_4$ and $y_5$ characterize the four graduated neutral density filters. The parameters $\eta_1$ to $\eta_5$ denote the detection sensitivities of the channels, the variation of which can have different causes (e.g. component fluctuations, etc.). Energy fluctuations (laser pulse fluctuations) are eliminated by normalization to the reference signal, which here is obtained by the uniform graduated neutral density filter having the transmission ½. The four normalized signals then contain the information about the light distribution and read:

$$\frac{S_1}{S_3} = \underbrace{\frac{\eta_1}{\eta_3}\left(1 - 2\frac{x_1}{W_1}\right)}_{C_1} + \underbrace{\frac{\eta_1}{\eta_3}\frac{1}{W_1}}_{G_1}\bar{x} = C_1 + G_1\bar{x}, \tag{26}$$

$$\frac{S_2}{S_3} = \underbrace{\frac{\eta_2}{\eta_3}\left(1 - 2\frac{y_2}{W_2}\right)}_{C_2} + \underbrace{\frac{\eta_2}{\eta_3}\frac{1}{W_2}}_{G_2}\bar{y} = C_2 + G_2\bar{y},$$

$$\frac{S_4}{S_3} = \underbrace{\frac{\eta_4}{\eta_3}\frac{2}{W_4^2}}_{G_4}(\langle x^2 \rangle - 2x_4\bar{x} + x_4^2) = G_4(\langle x^2 \rangle - 2x_4\bar{x} + x_4^2),$$

-continued $$\frac{S_5}{S_3} = \underbrace{\frac{\eta_5}{\eta_3}\frac{2}{W_5^2}}_{G_5}(\langle y^2 \rangle - 2y_5\bar{y} + y_5^2) = G_5(\langle y^2 \rangle - 2y_5\bar{y} + y_5^2).$$

The design parameters are combined therein in part to form effective parameters. The two offset values $C_1$ and $C_2$, the four gain values $G_1$, $G_2$, $G_4$ and $G_5$ and also the two vertex positions $x_4$ and $y_5$ then remain to be determined by calibration or in some other way. By rearranging the equations of equation system (21) and with knowledge of the eight calibration parameters, the beam position and beam size information finally result from the measurement signals in accordance with $$\bar{x} = \frac{1}{G_1}\left(\frac{S_1}{S_3} - C_1\right), \tag{27}$$

$$\bar{y} = \frac{1}{G_2}\left(\frac{S_2}{S_3} - C_2\right),$$

$$w_x^2 = \langle x^2 \rangle - \bar{x}^2 = \frac{1}{G_4}\frac{S_4}{S_3} + 2x_4\bar{x} - x_4^2 - \bar{x}^2,$$

$$w_y^2 = \langle y^2 \rangle - \bar{y}^2 = \frac{1}{G_5}\frac{S_5}{S_3} + 2y_5\bar{y} - y_5^2 - \bar{y}^2,$$

$$w^2 = w_x^2 + w_y^2.$$

To summarize, second-order graduated neutral density filters also offer metrological access to the beam size parameters $w_x^2$ and $w_y^2$.

If only the beam size $w^2 = w_x^2 + w_y^2$ is of interest, then proceeding from the embodiment in FIG. 8B the two graduated neutral density filters having a parabolic transmission profile can be replaced by a single graduated neutral density filter having a transmission profile in the shape of a paraboloid of revolution in order to obtain a graduated neutral density filter arrangement 823 in accordance with FIG. 8C. The obtaining of signals should be correspondingly adapted in accordance with the scheme described above.

With the use of spatially displaced parabolic transmission profiles, it is furthermore possible to realize a focus position and focus size sensor that manages without the use of linear transmission profiles. One exemplary configuration of such a graduated neutral density filter arrangement 824 is shown in FIG. 8D. The principle is based on pairwise parabolic graduated neutral density filters whose vertices are displaced pairwise oppositely along the profile axis.

For this design, the signals normalized to the reference result as:

$$\frac{S_1}{S_3} \propto G(\langle x^2 \rangle - 2x_0\bar{x} + x_0^2), \tag{28}$$

$$\frac{S_2}{S_3} = G(\langle x^2 \rangle - 2x_0\bar{x} + x_0^2),$$

$$\frac{S_4}{S_3} = G(\langle y^2 \rangle - 2y_0\bar{y} + y_0^2),$$

$$\frac{S_5}{S_3} = G(\langle y^2 \rangle - 2y_0\bar{y} + y_0^2).$$

In order to explain the principle more simply, a uniform gain value G is assumed for all the graduated neutral density filters (or "channels"). The vertex displacements are $x_1 = x_0$, $x_2 = -x_0$, $y_4 = y_0$ and $y_5 = -y_0$. Summation and subtraction yield the following equations, from which the centroid coordinates and the spot sizes can in turn be extracted with knowledge of the vertex displacements.

$$\frac{1}{G}\left(\frac{S_2}{S_3} - \frac{S_1}{S_3}\right) = 4x_0\bar{x}, \qquad (29)$$

$$\frac{1}{G}\left(\frac{S_2}{S_3} + \frac{S_1}{S_3}\right) = 2(\langle x^2 \rangle + x_0^2),$$

$$\frac{1}{G}\left(\frac{S_5}{S_3} - \frac{S_4}{S_3}\right) = 4y_0\bar{y},$$

$$\frac{1}{G}\left(\frac{S_5}{S_3} + \frac{S_4}{S_3}\right) = 2(\langle y^2 \rangle + y_0^2).$$

The scheme described above can be continued arbitrarily for measuring higher-order moments. The centroid-related moments $$\bar{m}_{k,l} = \int_{-\infty}^{+\infty} dx dy I_{FF}(x, y)(x-\bar{x})^k(y-\bar{y})^l, k, l > 1 \qquad (30)$$

here represent the shape aspects of the intensity distribution (3rd moments: "Skewness"; 4th moments: Curvature or "curtosis", . . . )

An embodiment of a graduated neutral density filter arrangement 920 using four graduated neutral density filters 921-924 is considered in greater detail below with reference to FIGS. 9A-C. In this case, the graduated neutral density filter arrangement 920 in accordance with FIG. 9A has a first graduated neutral density filter 921 having a linear transmission profile in the x-direction, a second graduated neutral density filter 922 having a linear transmission profile in the y-direction, a third graduated neutral density filter 923 having a constant transmission profile as reference, and a fourth graduated neutral density filter 924 having a transmission profile in the shape of a paraboloid of revolution, whereby the beam parameters $\bar{x}$, $\bar{y}$ and $w^2=w_x^2+w_y^2$ become accessible metrologically after focusing.

Figure 9A:
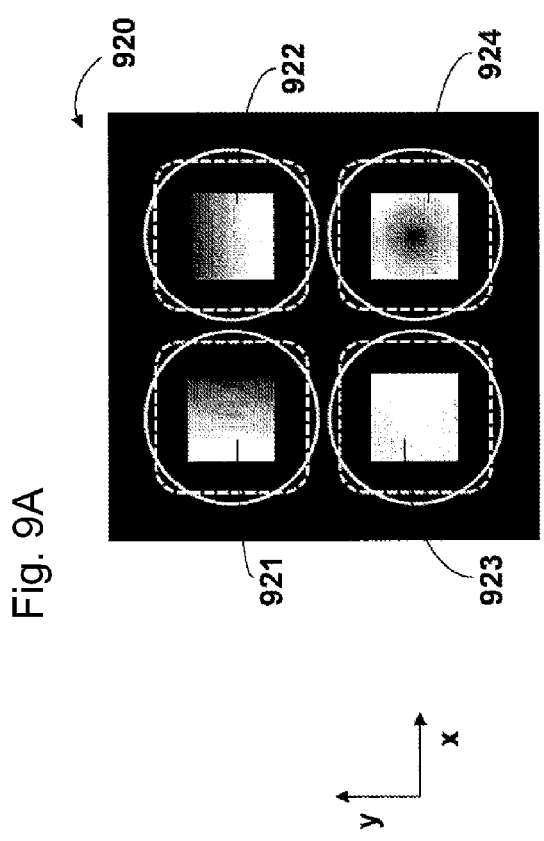
Figure 9C:
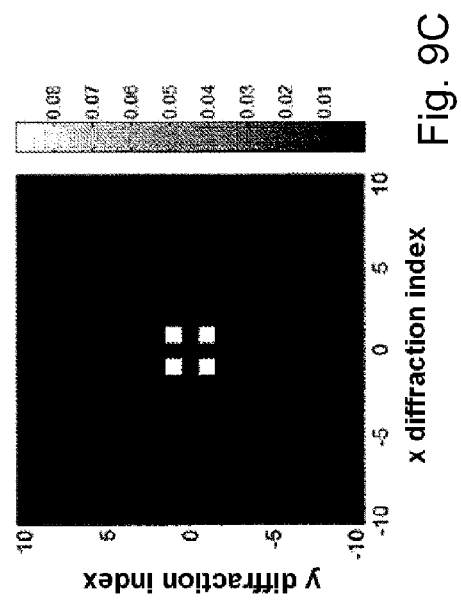
Figure 9B:
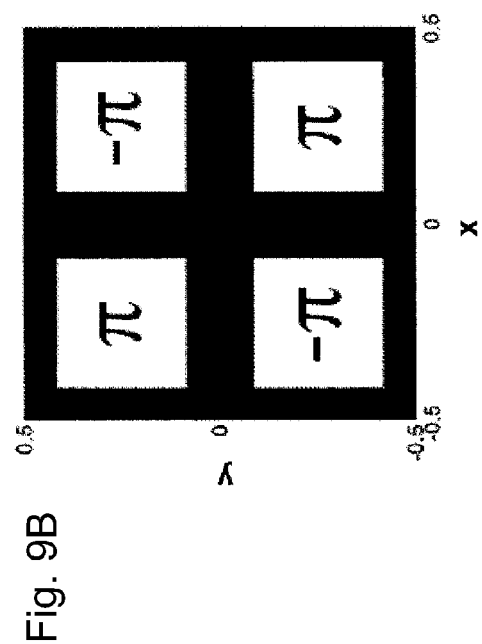

The solid circles in FIG. 9A symbolize the lens elements of the lens element arrangement following the graduated neutral density filter arrangement 920, and the dashed rounded squares symbolize the light intensity sensors of the light intensity sensor arrangement. A parasitic zero order of diffraction and the higher parasitic orders of diffraction are not transmitted.

A 2D grating is required for the splitting—already described initially—of the light beam to be analyzed (the grating concentrating the energy into the first four diagonal orders of diffraction). For this purpose, it is possible to use a hybrid (i.e. configured as a combined amplitude-phase DOE) binary grating (chequered grating design) indicated in FIG. 9C, as is illustrated in FIGS. 9B-C. FIG. 9C shows an elementary cell of the hybrid chequered grating optimized for an energy concentration in the first four diagonal orders of diffraction. White regions have the transmission 1 and have a constant phase in accordance with the value indicated in the field. FIG. 9C shows the strength of the order of diffraction. By using the special grating design, 89% of the transmitted energy is concentrated into the first four diagonal orders of diffraction. In particular, neither the zero order of diffraction nor all higher orders of diffraction occur for an ideally manufactured grating.

Figure 10:
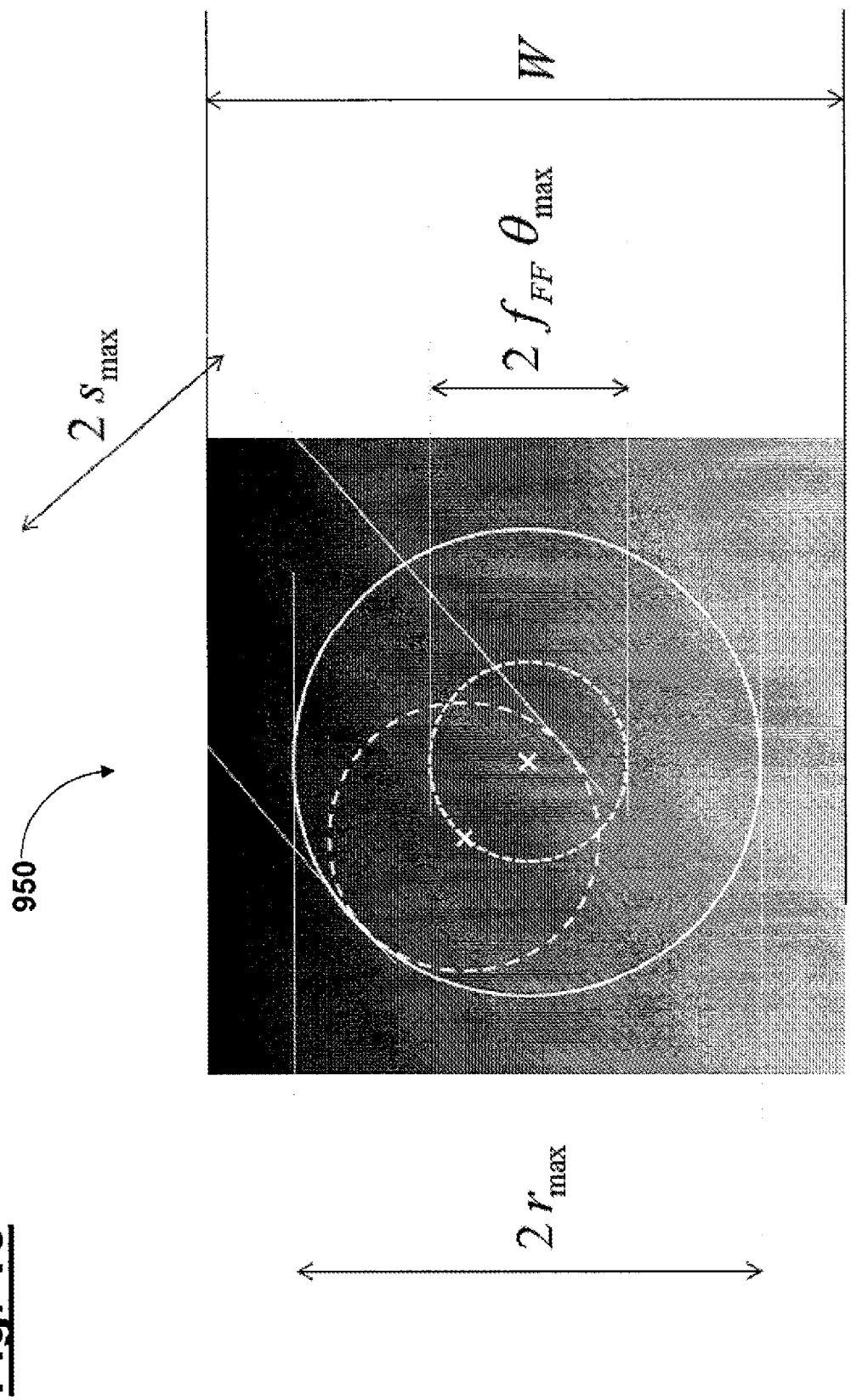
Figure 13:
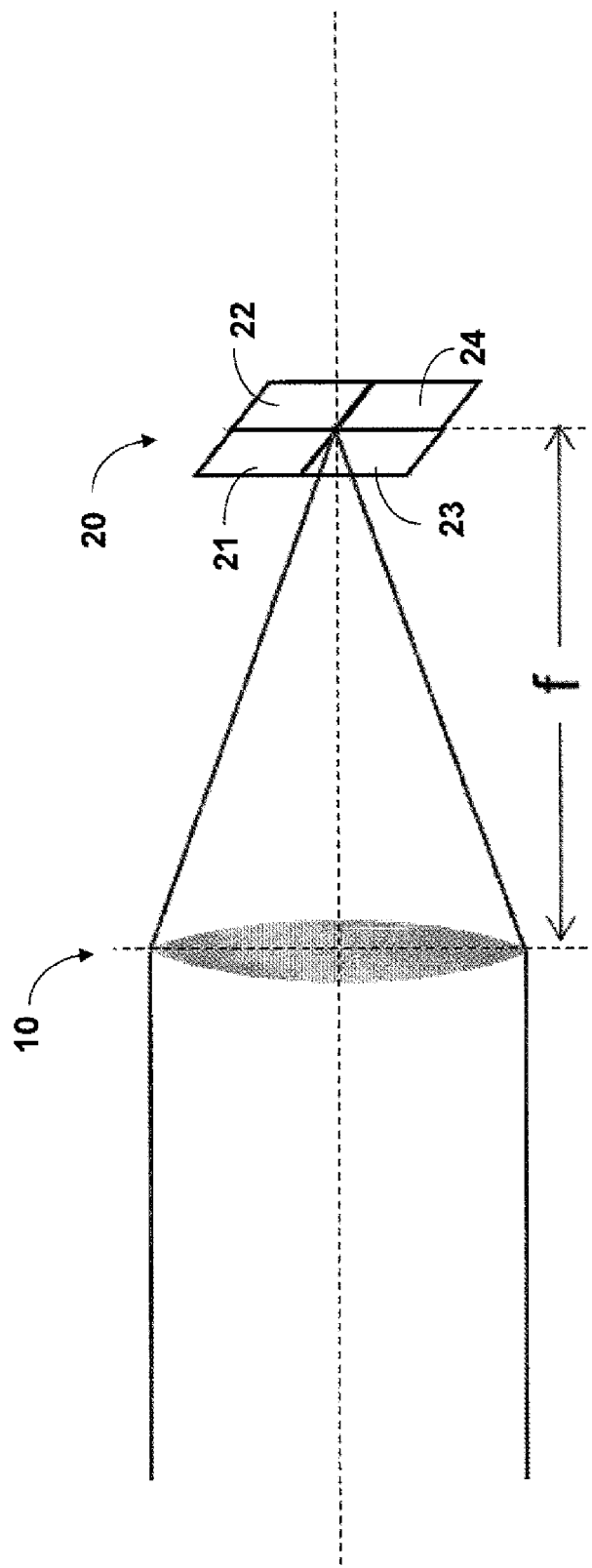
FIG. 13 shows a schematic illustration for elucidating a conventional approach for beam analysis.

An exemplary design of a graduated neutral density filter 950 is illustrated in FIG. 10. The parameters determining the design are:

Radius $s_{max}$ of the intensity structure. This is crucially determined by the basic properties of the beam (aperture, divergence) and its variations (aberrations, focus variation, etc.) and should be defined in such a way that neighboring replicated intensity structures whose delimiting circles just mutually touch one another never become superimposed or interfere at all in a disturbing manner during operation.

Radius $\theta_{max}$ of the region in the angle space which restricts the beam direction variations that occur (and are to be measured).

Radius of the used region in the far field (=graduated filter plane) $r_{max}$. In accordance with the geometry illustrated in FIG. 10, $r_{max}=\theta_{max} f_{FF}+s_{max}$ holds true. In that, $f_{FF}$ denotes the focal length of the focusing lens element.

Width of the wedge profile W in which the transmission falls from 1 to 0 is thus given by $W=2\kappa_1 r_{max}$. The choice of the overflow parameter $\kappa_1$ ($>1.5$) depends on the reserves required for the adjustment or the system setup.

Absolute value of the diffraction angle $\Delta_\theta$ of the first orders of the replicating 2D chequered grating is determined by the distance between the graduated filter centers and the optical axis, in accordance with $f_{FF}\Delta_\theta=\kappa_2 \sqrt{2}W$, $\kappa_2>0.5$. The factor $\sqrt{2}$ takes account of the diagonal channel arrangement. The effect of a parasitic zero order is advantageously blocked by a dark region of the size of a neutral density filter, which corresponds to $\kappa_2 \approx 1$.

FIGS. 11A-C and FIGS. 12A-D show schematic illustrations for elucidating concrete embodiments of a graduated neutral density filter having binary sub-wavelength structures that is usable in the context of the present invention. These embodiments take account of the circumstance that in the concept according to the invention comparatively stringent requirements have to be made of the quality of the graduated neutral density filter(s) used, since this directly determines the accuracy achieved in the position measurement and possible transmission profile fluctuations result in corresponding measurement errors in the beam analysis.

Given typical dimensions of the entire measuring device and in order to achieve sufficiently high sensitivities in determining the beam direction, generally steep transmission variations of the graduated neutral density filter(s) used over short distances are required (e.g. typical transmission gradients in the range of 0.2 mm$^{-1}$ to 5 mm$^{-1}$). Given typical sought "accuracy vs. measurement range" ratios of 1:1000 (e.g.: measurement range in determining beam angle: ±1 mrad with accuracy of ±1 gad), it may furthermore be demanded, for example, that the deviation of the local transmission is not greater than ¹⁄₁₀₀₀ of the total transmission range.

In the realization of the binary sub-wavelength structures mentioned above, e.g. each graduated neutral density filter has a planar, transmissive substrate on which nontransmissive or light-nontransmissive (i.e. either completely absorbent or completely reflective) binary sub-wavelength structures are applied. Merely by way of example a graduated neutral density filter may have approximately a size of 1 mm*1 mm and be printed with a structure of 1000*1000 pixels, thus resulting in structure elements having a size of approximately 1 μm, the size of which is thus significantly below the exemplary wavelength of approximately 10.6 μm of a light beam to be analyzed in the long-wave infrared range.

Unlike in the case of diffraction gratings (having structures approximately of the size of the wavelength or larger), such sub-wavelength structures have a period smaller than the wavelength, which has the effect that no defined diffraction occurs (that is to say that virtually only the zero order is transmitted). The binary structures according to the invention are arranged, then, such that averaged over a specific region (approximately corresponding to the spot size of the light beam to be analyzed) on average effective transmission values or gray-scale values of between 0 and 1 are obtained.

In order to avoid undesired periodicities (which would in turn result in undesired diffraction effects), it is possible to use in principle e.g. methods known from printing technology (e.g. Floyd-Steinberg algorithm). One such method was used in the embodiment shown in FIGS. 11A-B. In this case, FIG. 11A shows the realized transmission profile (gray-scale profile) 961, and FIG. 11B shows the binary structure 962 used for this purpose. As evident from the corresponding Fourier transformation 963 in accordance with FIG. 11C, no undesired periodic structures occur.

The local averaging necessary to obtain an effective local transmission $T_{eff}$ for the binary structures is thus realized by integration over the finite beam size:

$$T_{eff} = \frac{\int_{-\infty}^{+\infty} dx dy I_0(x, y) T(x, y)}{\int_{-\infty}^{+\infty} dx dy I_0(x, y)} \qquad (31)$$

In this case, $I_0(x, y)$ is the incoming intensity distribution and $T(x, y)$ is the (binary) transmission of the graduated neutral density filter. In order to achieve the required linearity of the graduated neutral density filter, a sufficiently large number of binary structure elements must lie in the integration region of the beam. In order to achieve an "accuracy vs. measurement range" ratio of 1:1000, the beam can cover e.g. approximately 100*100 structure elements.

In accordance with FIG. 12B, for instance in a simulation for the binary sub-wavelength structure of a graduated neutral density filter as shown in FIG. 12A, a Gaussian light spot moves from left to right, wherein a very good linearity (in particular without undesired granularities owing to the structure elements) arises in the plot in FIG. 12C for the light intensity transmitted by the graduated neutral density filter. A position error resulting from the very small deviations from linearity, as shown in FIG. 12D, is significantly below 1 μm over a distance of approximately 600 μm, such that a very good ratio of measurement error to measurement range is obtained.

Even though the invention has been described on the basis of specific embodiments, numerous variations and alternative embodiments are evident to the person skilled in the art, e.g. through combination and/or exchange of features of individual embodiments. Accordingly, such variations and alternative embodiments are concomitantly encompassed by the present invention, and the scope of the invention is restricted only within the meaning of the appended patent claims and the equivalents thereof.

What is claimed is:

1. A system for analyzing a light beam guided by a beam guiding optical unit, comprising:
    a graduated neutral density filter arrangement, which is arranged in a far field plane of the beam guiding optical unit and comprises at least one graduated neutral density filter having a spatially varying transmission;
    a light intensity sensor arrangement comprising at least one light intensity sensor, which is arranged in a near field plane of the beam guiding optical unit and is configured to measure, for each said graduated neutral density filter of the graduated neutral density filter arrangement, a light intensity transmitted by each said graduated neutral density filter; and
    a first Fourier optical unit and a second Fourier optical unit in a Kepler telescope arrangement, wherein the far field plane of the beam guiding optical unit is situated between the first and the second Fourier optical units with respect to a propagation direction of the light beam, and wherein the near field plane of the beam guiding optical unit is situated downstream of the second Fourier optical unit with respect to the propagation direction of the light beam.

2. The system as claimed in claim 1, wherein at least one said graduated neutral density filter has a transmission profile that is linear in a predetermined spatial direction.

3. The system as claimed in claim 1, wherein the graduated neutral density filter arrangement comprises a first said graduated neutral density filter having a linear transmission profile in a first spatial direction and a second said graduated neutral density filter having a linear transmission profile in a second spatial direction, which differs from the first spatial direction.

4. The system as claimed in claim 3, wherein the second spatial direction is perpendicular to the first spatial direction.

5. The system as claimed in claim 1, wherein said at least one graduated neutral density filter has a transmission profile that is parabolic at least in a predetermined spatial direction.

6. The system as claimed in claim 1, wherein said at least one graduated neutral density filter has a transmission profile having a geometry shaped as a paraboloid of revolution or a saddle-shaped geometry.

7. The system as claimed in claim 1, wherein said at least one graduated neutral density filter has a constant transmission profile enabling an intensity normalization.

8. The system as claimed in claim 1, wherein the graduated neutral density filter arrangement comprises an array of a plurality of said graduated neutral density filters.

9. The system as claimed in claim 1, wherein the light intensity sensor arrangement comprises an array of a plurality of said light intensity sensors.

10. The system as claimed in claim 1, further comprising:
    a beam splitting structure configured to split the light beam being analyzed into a plurality of partial beams and arranged upstream of the graduated neutral density filter arrangement with respect to the propagation direction of the light beam.

11. The system as claimed in claim 10, wherein the beam splitting structure is arranged in the near field plane of the beam guiding optical unit.

12. The system as claimed in claim 1, wherein said at least one graduated neutral density filter is formed from binary structures, wherein structure sizes of the binary structures are smaller than a wavelength of the light beam being analyzed.

13. The system as claimed in claim 1, wherein the light beam being analyzed is a laser beam.

14. The system as claimed in claim 13, wherein the light beam being analyzed is a laser beam having an infrared wavelength.

15. A method for analyzing a light beam guided by a beam guiding optical unit, comprising:
    directing the light beam being analyzed
        via a graduated neutral density filter arrangement, which is arranged in a far field plane of the beam guiding optical unit and has at least one graduated neutral density filter having spatially varying transmission and via a first Fourier optical unit and a second Fourier optical unit, wherein the far field plane of the beam guiding optical unit is situated between the first and the second Fourier optical units with respect to a propagation direction of the light beam, and wherein the near field plane of the beam guiding optical unit is situated downstream of the second Fourier optical unit with respect to the propagation direction of the light beam, onto a light intensity sensor arrangement having at least one light intensity sensor, which is arranged in a near field plane of the beam guiding optical unit, measuring, for each said graduated neutral density filter of the graduated neutral density filter arrangement, a light intensity transmitted by each said graduated neutral density filter; and deriving at least one beam parameter for characterizing the light beam being analyzed from the measured light intensity.

16. The method for analyzing a light beam guided by a beam guiding optical unit of claim 15, further comprising determining a relative setting of the laser beam and a target droplet of the laser beam based upon the derived beam parameter.

17. The method for analyzing a light beam guided by a beam guiding optical unit of claim 16, wherein the laser beam comprises an infrared laser of an EUV light source and the droplet comprises a tin droplet.

* * * * *